Figure 1:
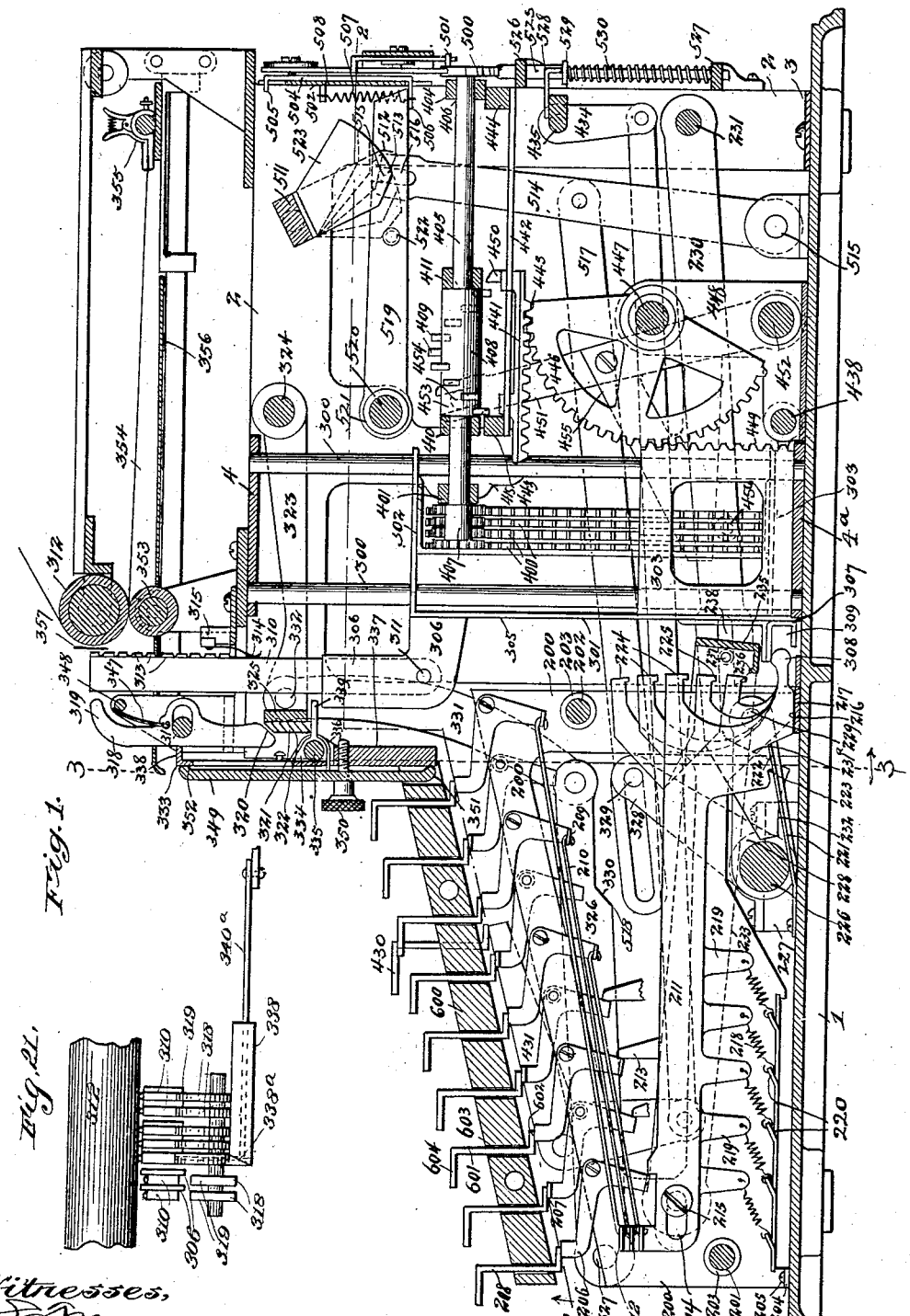

No. 717,396. Patented Dec. 30, 1902.
DE KERNIEA J. T. HIETT.
CALCULATING MACHINE.
(Application filed Feb. 24, 1902.)

(No Model.) 9 Sheets—Sheet 1.

No. 717,396. Patented Dec. 30, 1902.
DE KERNIEA J. T. HIETT.
CALCULATING MACHINE.
(Application filed Feb. 24, 1902.)
(No Model.) 9 Sheets—Sheet 2.

No. 717,396. Patented Dec. 30, 1902.
DE KERNIEA J. T. HIETT.
CALCULATING MACHINE.
(Application filed Feb. 24, 1902.)

(No Model.) 9 Sheets—Sheet 4.

No. 717,396. Patented Dec. 30, 1902.
DE KERNIEA J. T. HIETT.
CALCULATING MACHINE.
(Application filed Feb. 24, 1902.)
(No Model.) 9 Sheets—Sheet 5.

No. 717,396. Patented Dec. 30, 1902.
DE KERNIEA J. T. HIETT.
CALCULATING MACHINE.
(Application filed Feb. 24, 1902.)
(No Model.) 9 Sheets—Sheet 6.

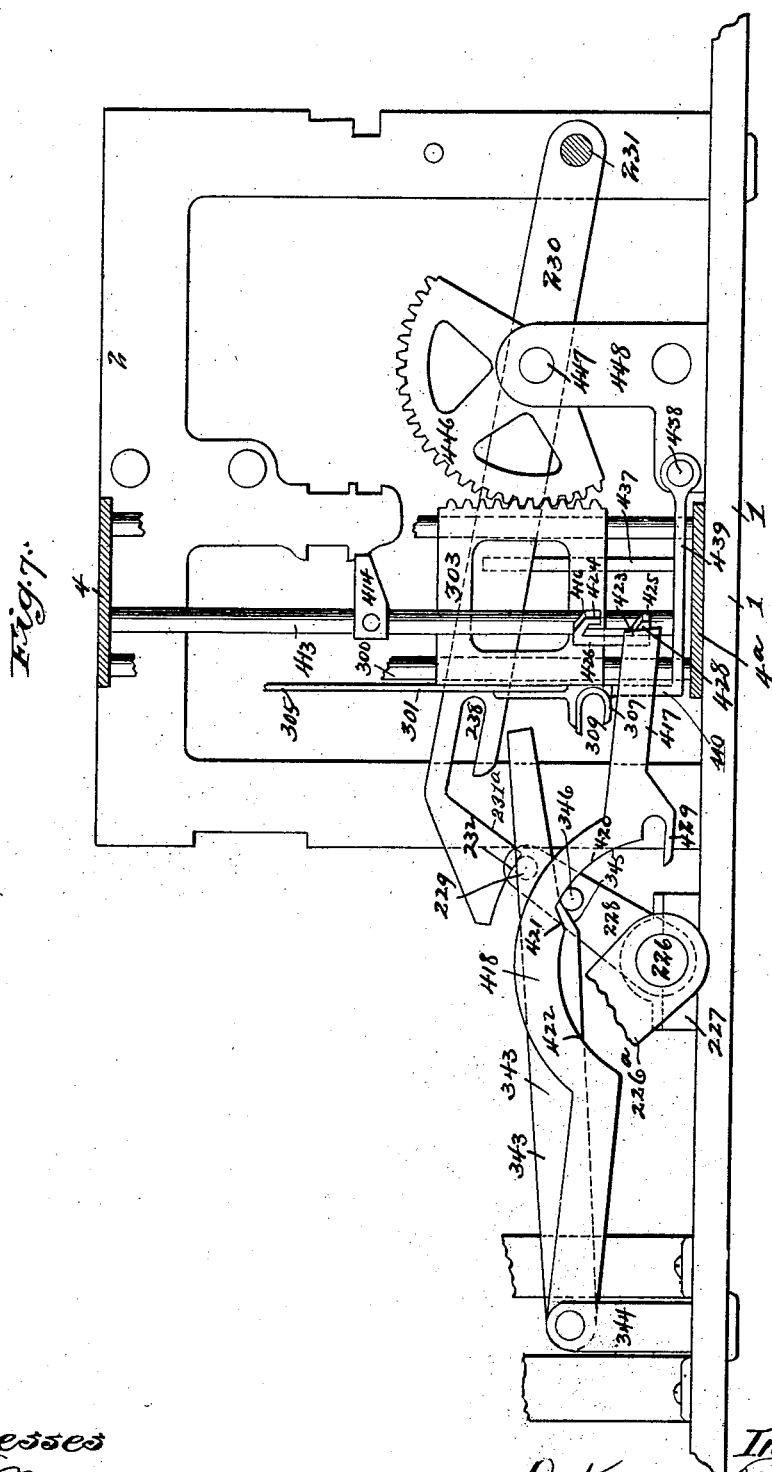

No. 717,396. Patented Dec. 30, 1902.
DE KERNIEA J. T. HIETT.
CALCULATING MACHINE.
(Application filed Feb. 24, 1902.)
(No Model.) 9 Sheets—Sheet 8.
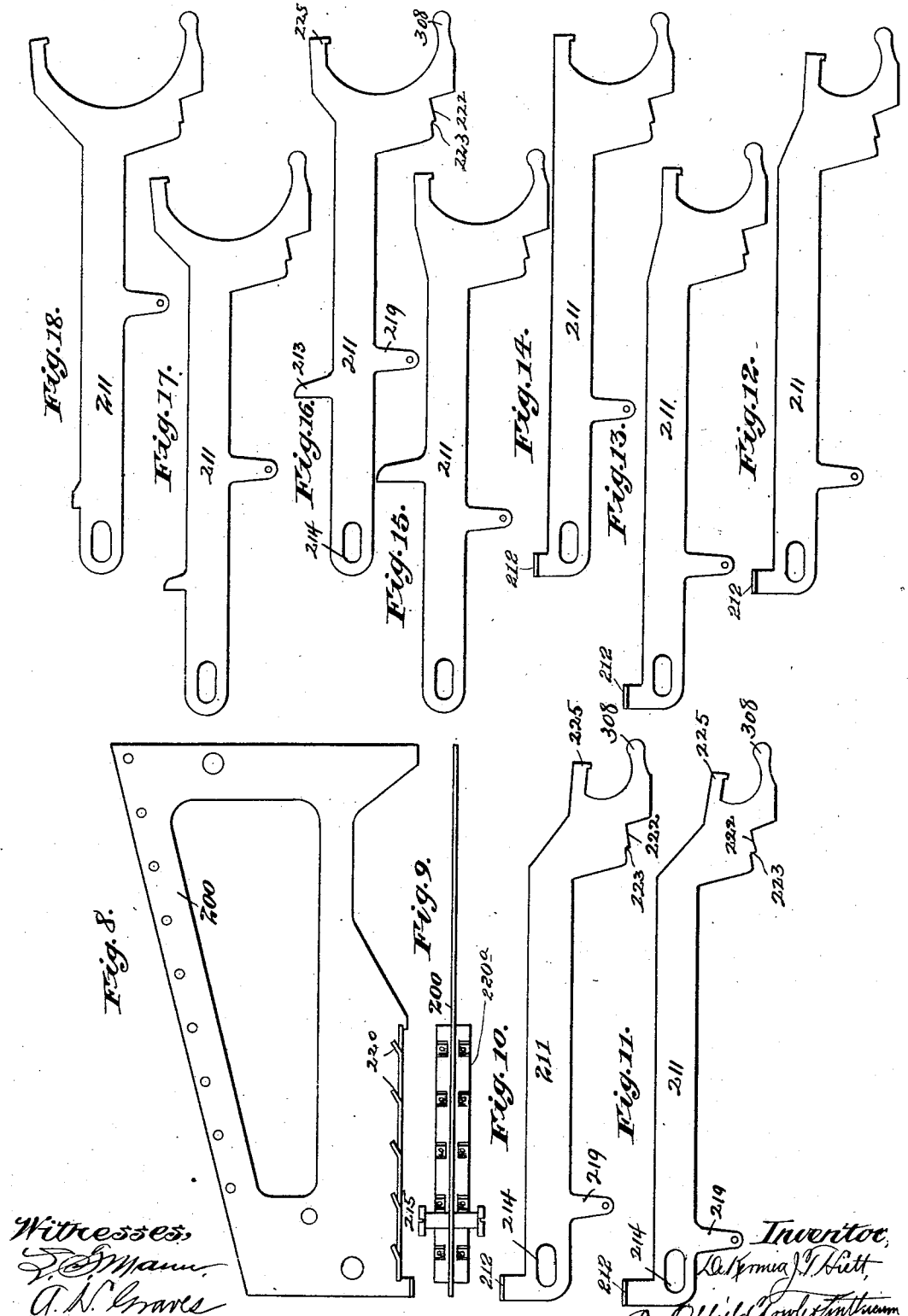

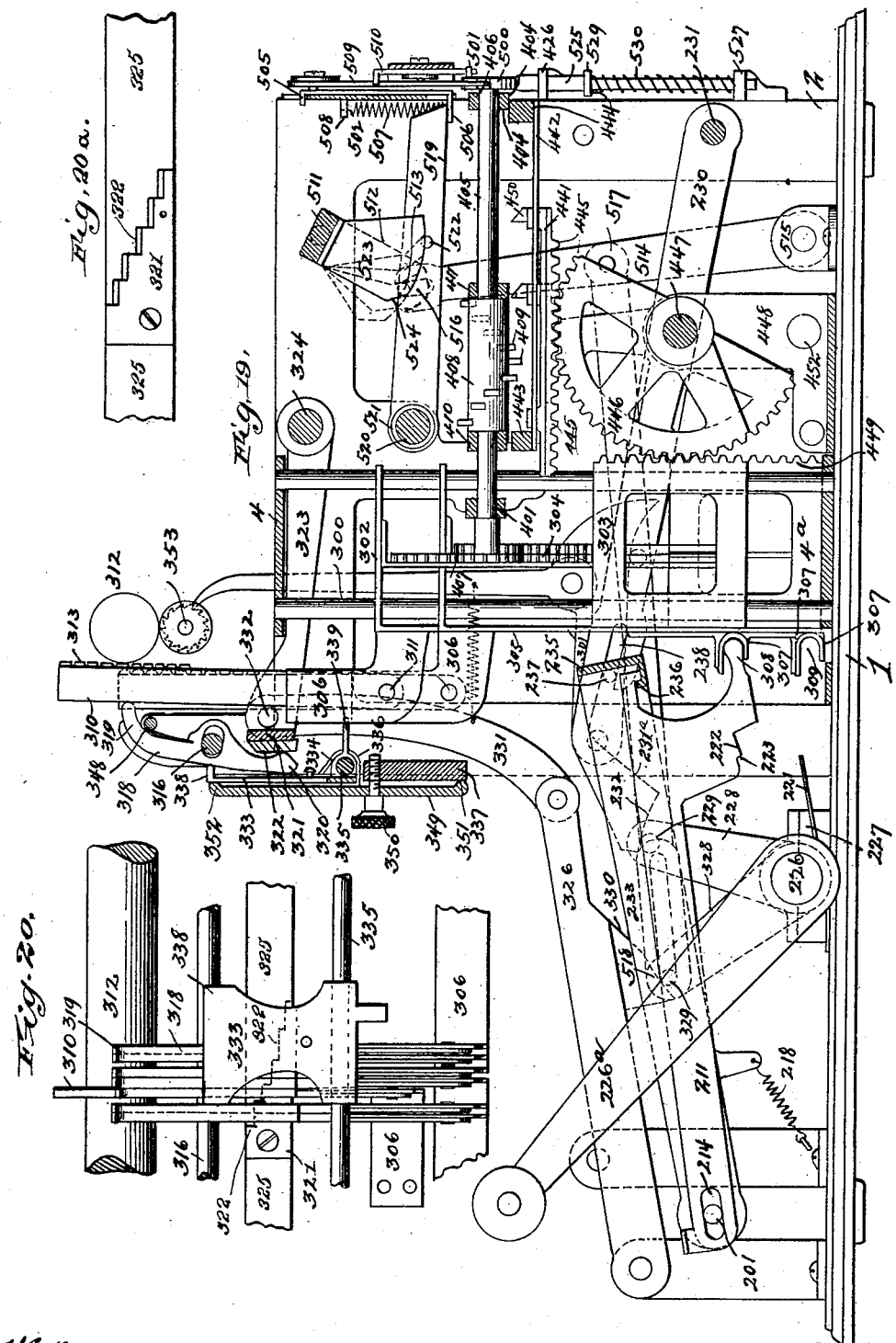

UNITED STATES PATENT OFFICE.

DE KERNIEA J. T. HIETT, OF ST. LOUIS, MISSOURI, ASSIGNOR OF THIRTEEN TWENTY-FIFTHS TO GUSTAVUS A. VON BRECHT, OF ST. LOUIS, MISSOURI.

CALCULATING-MACHINE.

SPECIFICATION forming part of Letters Patent No. 717,396, dated December 30, 1902.

Application filed February 24, 1902. Serial No. 95,343. (No model.)

*To all whom it may concern:*

Be it known that I, DE KERNIEA J. T. HIETT, a citizen of the United States, residing at St. Louis, in the State of Missouri, have invented certain new and useful Improvements in Calculating-Machines, of which the following is a full, clear, and exact specification.

This invention relates to improvements in calculating-machines, and refers more specifically to improvements in that type of calculating-machines which are used by accountants for recording and printing numerical items, for performing a mechanical addition of the sums of a plurality of items, and recording and printing these aggregates or totals, and for various other computations, as will hereinafter more fully appear.

Among the salient objects of the invention are to provide a machine of the character referred to in which all of the mechanical connections and movements of the correlated parts are positive and certain as distinguished from machines of this same general character in which the movement of coöperating parts has depended upon springs, friction devices, retarding devices, and the like; to provide a key-actuated "setting-up" mechanism which is absolutely independent in its operation of all other parts of the machine and in which the operation of each key serves to place a member or part in position to become an element of a positively-operating mechanism which subsequently determines or effects the recording or printing of a numeral corresponding to the key actuated; to provide in a key mechanism adapted for a machine of this general character a construction in which the keys are arranged in correlated groups representing the different orders of numerals and means are provided for automatically clearing or restoring any key of a given group by simply operating another key of the same group and without in any wise affecting the keys of other groups; to provide improvements in the construction and arrangement of the bank of keys of a machine of this character contributing to the accuracy and speed of operation, to the durability and neatness of appearance of the mechanism, and greatly improving the "touch" of the machine; to provide a construction in which the keys and key mechanism pertaining to each group or order of keys are mounted upon the same structural supports, so that machines of different capacities or numbers of orders may be built by simply adding to or leaving off a greater or less number of unit groups and in which the inspection, repair, and assemblement of the machine is facilitated; to provide an improved recording or printing mechanism in which the printing is effected by means of type-carriers independently movable and one for each group or order of keys and the actuation or selection of the type members which are to be brought into action upon any given operation is determined by means of novel mechanism; to provide in a printing mechanism of this general character improved means for insuring the actuation of every printing member or carrier to the right of or of a lower order than the numeral of highest order "set up," thereby insuring the printing of the naughts of the intervening and lower orders; to provide in a printing mechanism adapted to a machine of this general character means for bringing the printed members or carriers into printing engagement successively, so as to distribute the power required to effect the impressions over a substantial part of the movement of the actuating devices; to provide in a printing mechanism of this general character a construction in which the power required to operate the printing mechanism and produce the impression is directly proportional to the number of printing members brought into operation; to provide in a machine of this general character mechanism coöperating with the impression mechanism to expose to view or render visible the items immediately following the printing operation; to provide suitable coöperating mechanism for carrying into effect the several objects of the present invention as hereinbefore stated and as appears from the following description, and in general to provide improved features of construction and arrangement contributing to the production of an improved machine of the character referred to.

Figure 2:
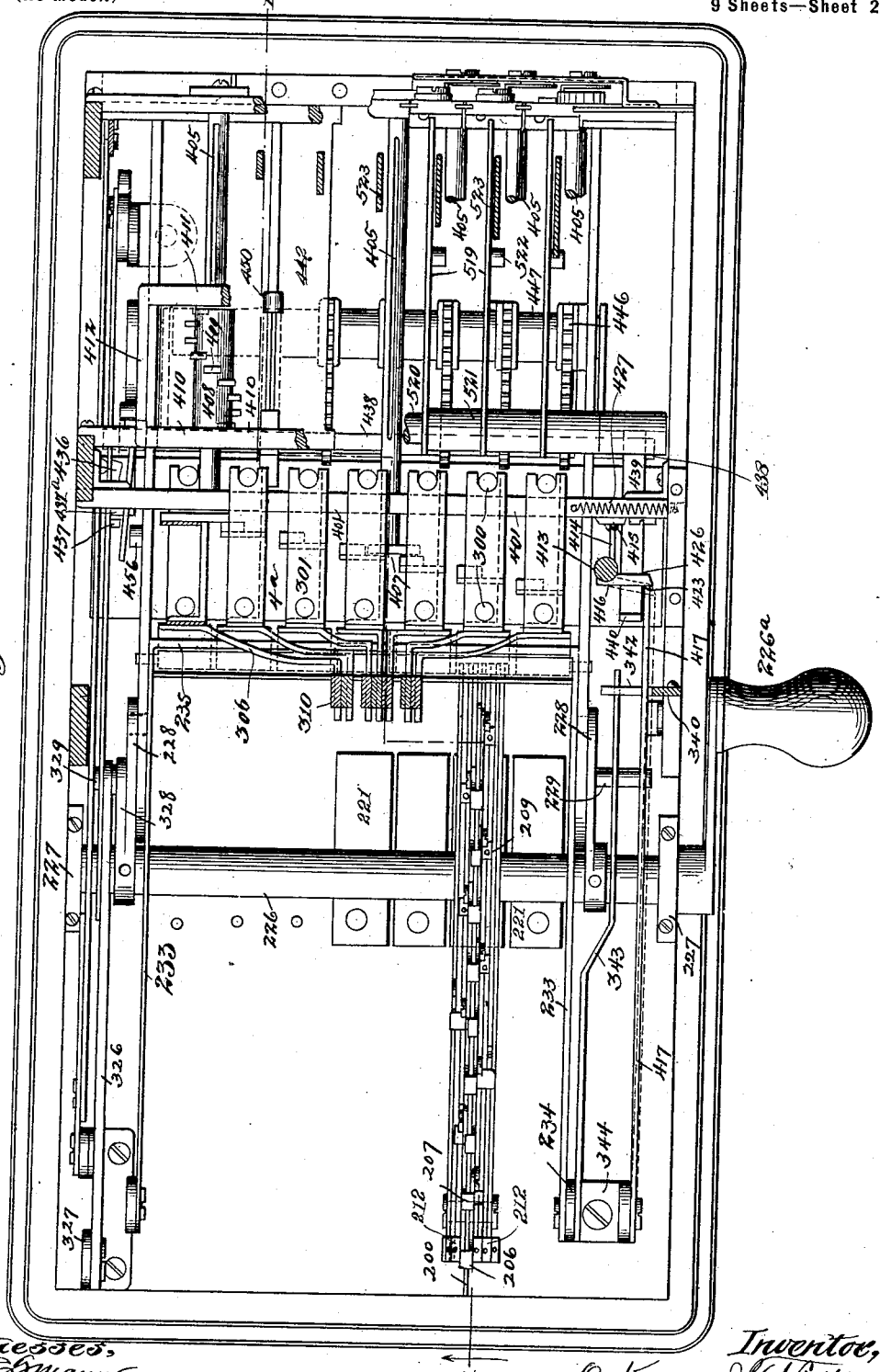
Figure 3:
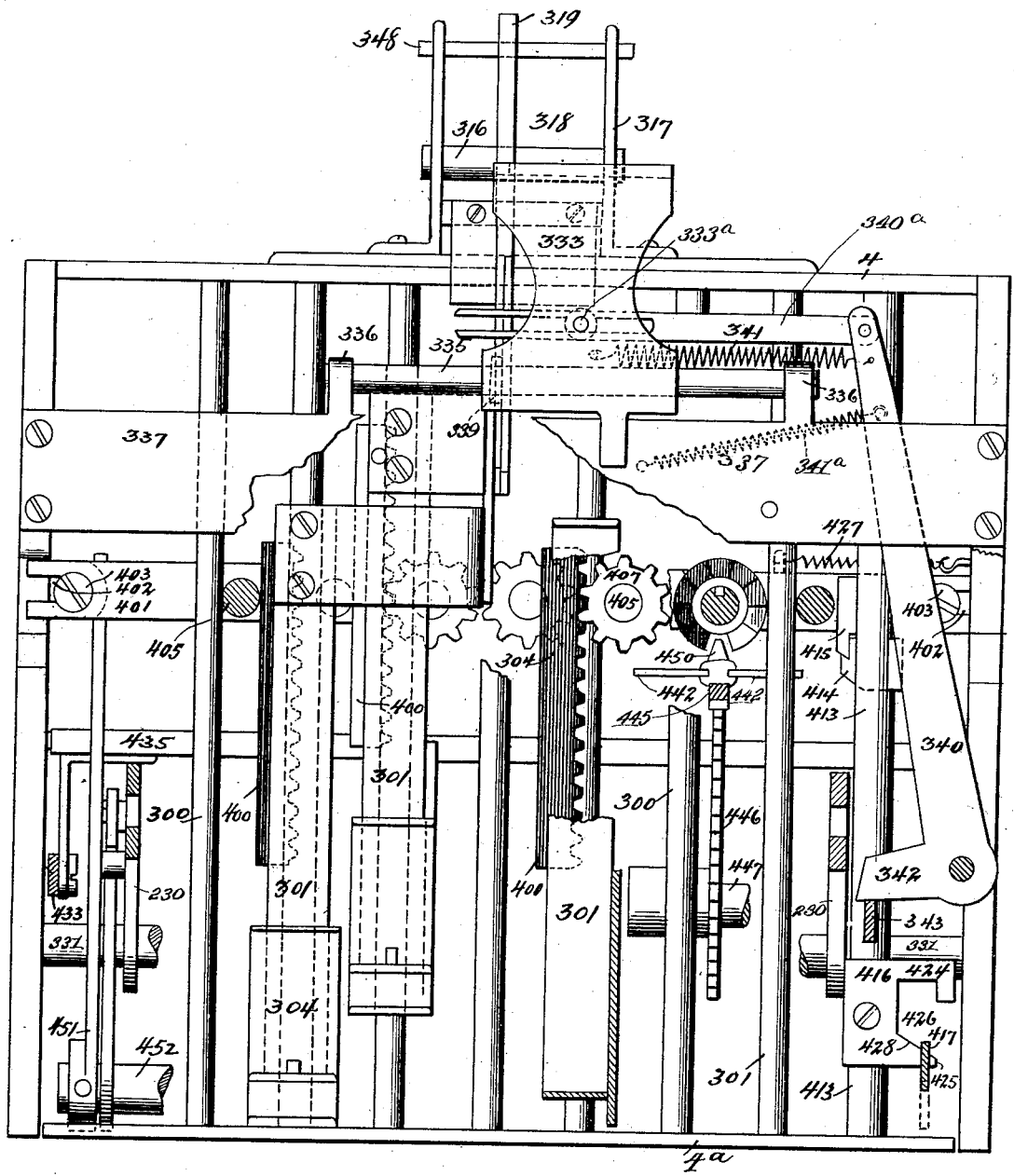
Figure 4:
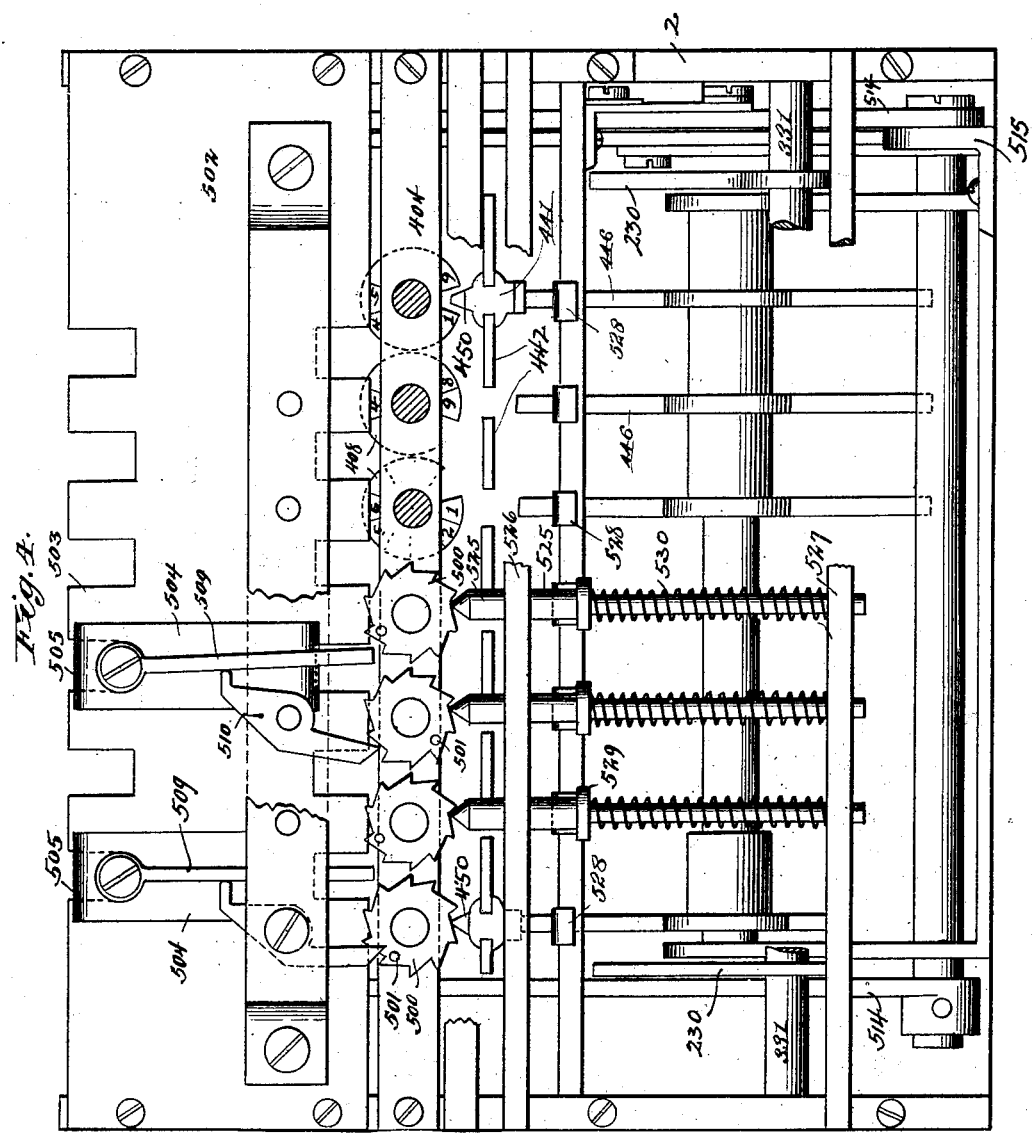
Figure 5:
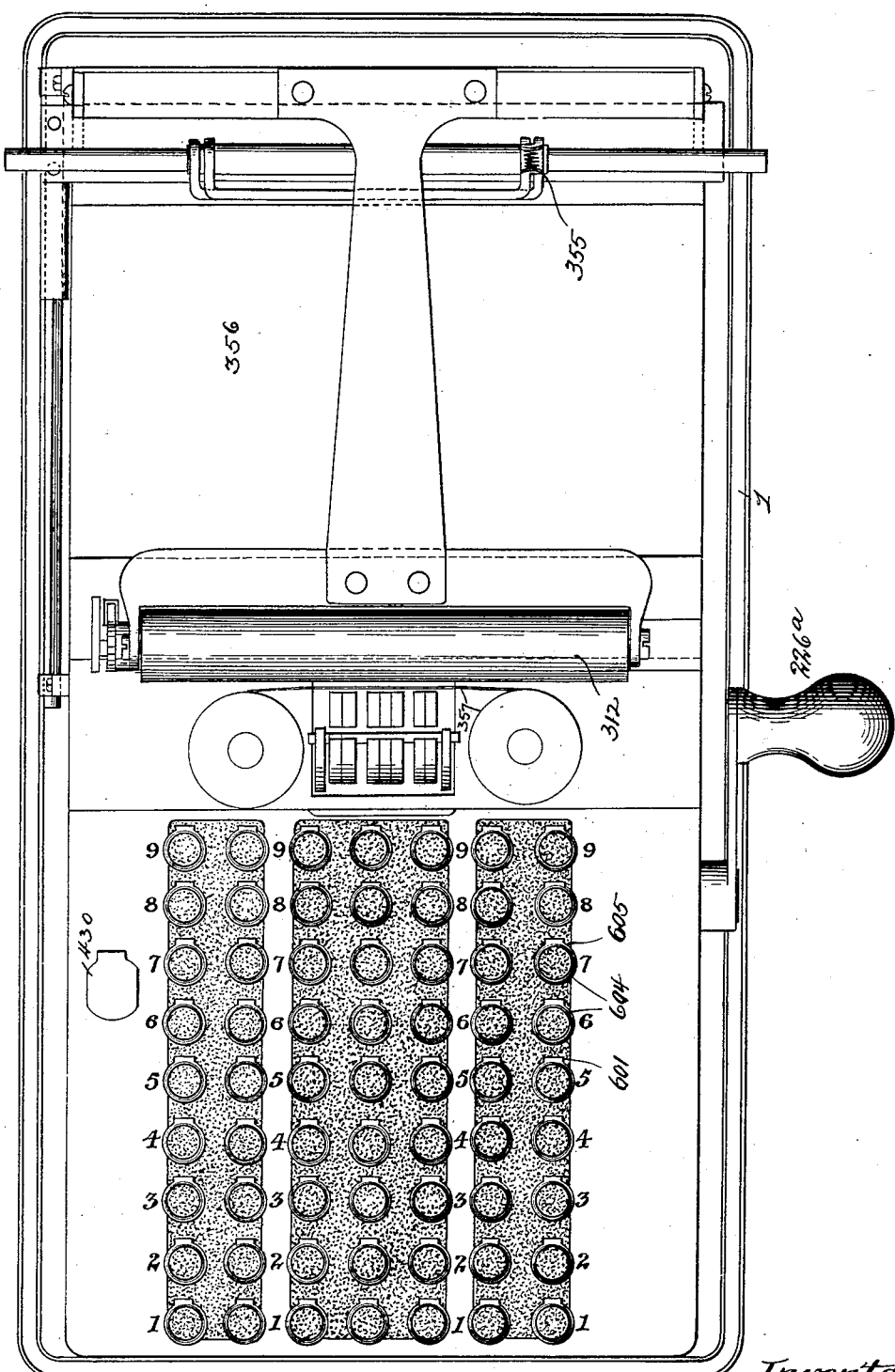
Figure 6:
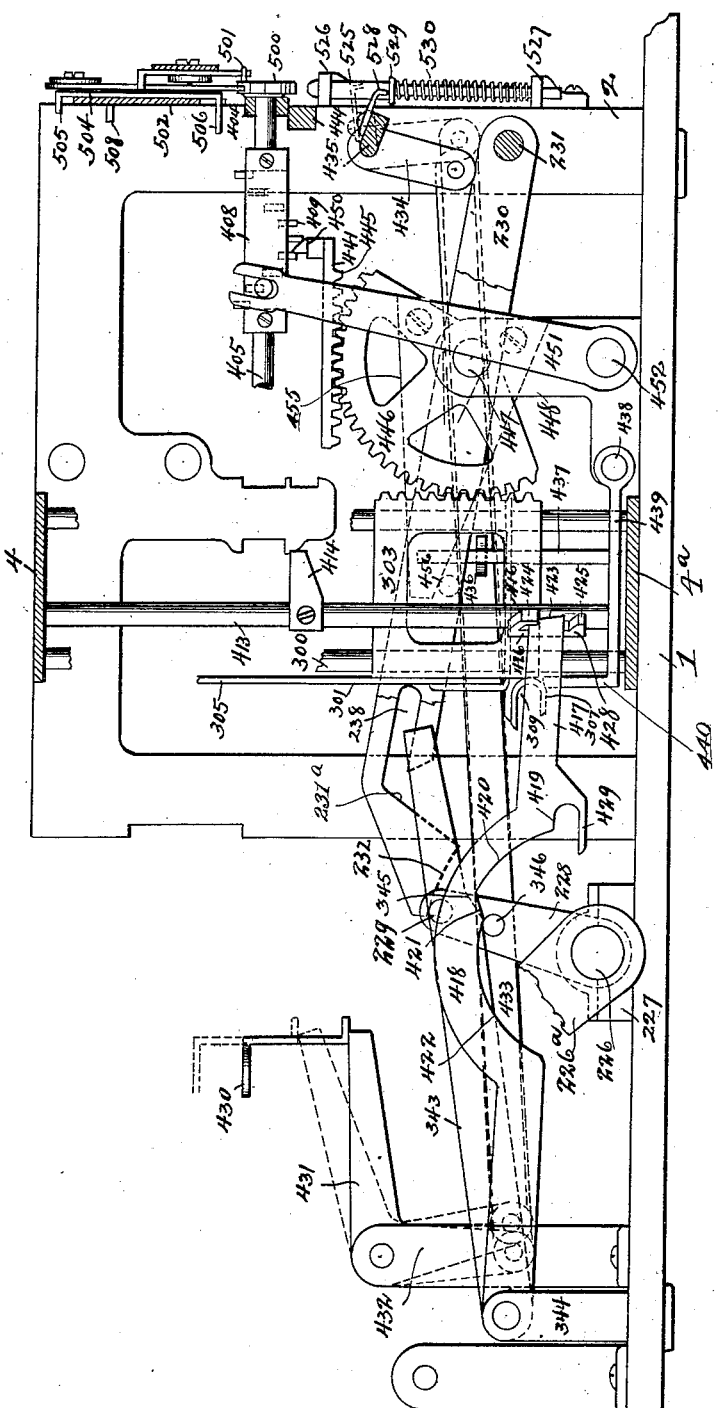

In the accompanying drawings, Figure 1 is a vertical longitudinal sectional view through a machine embodying my invention, certain parts being broken away to disclose underlying parts and other parts being omitted. Fig. 2 is a sectional plan view with certain parts broken away and others omitted and the outer casing of the machine being removed. Fig. 3 is a transverse vertical sectional view substantially on the line 3 3 of Fig. 1 looking in the direction of the arrow, the outside casing being removed and certain parts broken away to disclose underlying mechanism. Fig. 4 is a rear end view with the casing removed and certain parts broken away and others omitted. Fig. 5 is a top plan view of the entire machine, more particularly disclosing the key-manual. Fig. 6 is a side elevation, with the casing removed, of certain parts of the mechanism. Fig. 7 is a view generally similar to Fig. 6, but showing certain parts of the mechanism in different operative positions. Figs. 8 and 9 are side elevation and plan views, respectively, in isolated detail, of one of the key-lever-supporting frames employed in the machine; and Figs. 10 to 18, inclusive, are details of the connectors arranged in graduated series from the smallest to the largest. Fig. 19 is a view, partly in side elevation with the casing removed and partly in longitudinal vertical section, showing particularly the arrangement of the accumulators and coöperating mechanism. Fig. 20 is a fragmentary front elevation of the impression-levers, type-carriers, and platen and fulcrum-plate, the overlying adjustable plate being removed and showing particularly the construction and arrangement of the fulcrum-plate proper. Fig. 20ª is a fragmentary face view of a portion of a stepped cam-bar. Fig. 21 is a detail in top plan of the set of impression-levers, type-carriers, and coöperating fulcrum-plate and plate-support.

Although the present invention concerns more particularly the construction of the keyboard mechanism, the impression mechanism, and certain features coöperating therewith, yet nevertheless a comprehension of these features requires an understanding of their application to a complete adding-machine, and the entire machine will therefore be described herein, the description of those features not made the subject of claims in the present case being made as brief as consistent with a complete understanding of the invention.

Referring then to the several figures of the drawings, 1 designates as a whole a suitable base-plate, having a horizontal top surface and adapted to rest on any suitable support, and upon the rear portion of this base-plate is secured the main frame structure of the machine. In the present instance a pair of skeleton side plates (designated 2) are provided, one at each side of the machine these plates being arranged in parallel relation and being exact duplicates of each other. At their lower ends said side frames are made rigid with the base-plate in any suitable manner—as, for example, by being provided with feet portions 3, which are secured or bolted to the base-plate—while at their upper edges they are conveniently made rigid with each other by means of a cross frame member 4, in the present instance taking the form of a horizontal plate let into the upper edges of the side frame members and suitably bolted thereto. Between and upon said side frame members are mounted the impression mechanism, the accumulator mechanism, the carrying mechanism, and the recording-sheet mechanism, which several features will hereinafter be more fully described. The base-plate is extended beyond the forward ends of the side frame members a considerable distance, and upon this is mounted the keyboard and setting-up mechanism, which will first be described in detail.

Referring more particularly to Fig. 1, the numeral 200 designates each of a series of plate-like supports mounted to extend longitudinally of the machine, with their planes vertical and in parallel relation, there being one of these supports provided for each group of keys representing an order of numerals. In the preferred construction shown herein said supporting members are made rigid with each other by means of a pair of tie-rods 201 and 202, inserted through the front and rear ends thereof, the individual supports being suitably spaced apart by means of spacing-sleeves 203 and the outermost ones being secured in position by means of suitable nuts threaded upon the ends of the tie-rods. By means of this construction the supports, together with the parts mounted upon and coöperating therewith, may be assembled and placed and removed as a single structure. The key structure as a whole is suitably secured in position on the base-plate, conveniently by means of bracket-legs 204, formed integrally with the plate-like supports, arranged to rest directly upon the base, and secured to the latter by means of bolts or screws 205.

Inasmuch as the several groups of keys and their supports are identical in structure, the description of one will apply to all.

206 designates each of a series of angular key-levers, there being nine of these levers in the series, suitably mounted upon the upper portion of the support 200, so as to oscillate in vertical planes, these key-levers being for convenience of structure and arrangement disposed alternately on opposite sides of the support and uniformly spaced apart throughout the length of the latter. Each key-lever is provided at its upper end with a horizontal extension or lug 207, adapted for engagement by the lower end of a key, as 208, while at its lower end it is likewise provided with a horizontal lateral extension or lug 209, certain of which lugs are adapted for engagement with an actuating-rod 210. The lugs 209 of the key-levers are successively longer from the foremost key-lever rearwardly and in each instance desirably extend laterally outward in a direction away from the support upon which the key-lever is mounted in order to bring the ends of the lugs severally vertically above a series of connectors, (designated 211.)

As best shown in Fig. 1, the connectors 211 each consist of a bar or plate-like member arranged with its plane vertical and to extend longitudinally beneath the corresponding connecting-rod 210 from the front portion of the key mechanism rearwardly to a point contiguous to the mechanism contained within the main frame of the machine, each group of nine connectors being arranged side by side, as shown clearly in Fig. 1. The five connectors which are engaged with the five rearmost keys of the group are severally provided at their forward ends with laterally-extending lugs 212, adapted for engagement with the several rods 210, while the four remaining ones of the group are provided with upstanding integral lug portions 213, which are directly engaged by the laterally-extending lugs 209 of the corresponding key-levers, thereby dispensing with the necessity of connecting-rods as to these key-levers.

The connectors are so mounted as to be capable of an endwise-reciprocatory movement and also a lifting-up movement about a pivotal axis located near their forward ends, and to this end each connector-bar is provided at its forward end with a longitudinally-extending slot 214, which embraces or engages a pivoting guide-stud 215, mounted rigidly in the support 200, said stud 215 being in the present instance arranged to extend through the supporting-plate and project at either side thereof a sufficient distance to support the several connectors belonging to the group at the respective sides thereof. At their forward ends each connector is provided with a shoe-like lower surface 216, which is arranged to rest and slide upon a plate 217, resting upon the base-plate 1.

The depression of any one of the keys of a given group operates to oscillate its key-lever and through the action of the latter to thrust the corresponding connector bodily rearward. The bodily rearward movement of the connector is effected against the tension of a suitable spring, tending to return the same to its normal forward limit of movement, said springs being in the present instance in the form of coiled contractile springs 218, which are conveniently adapted to depending lugs 219, formed upon the connectors, and extend thence obliquely downwardly and rearwardly and are connected to suitable stationary supports 220, in the present instance formed integrally upon the supporting-plate 200. In order to hold any given connector at its forward limit of movement after it has been shifted forwardly by the depression of a key, I provide a plate-spring 221, mounted upon the base-plate beneath the group of connectors and arranged to extend obliquely upwardly and rearwardly, so as to bear at its free end against a shoulder or surface 222, formed upon each connector, it being understood that said plate-spring is of a width equal to the entire width of the group of connectors, so as to be common to all. Each connector is provided at a point a distance in rear from the rear end of the plate-spring equal to the throw or extent of movement of the connector with a shoulder 223, adapted for engagement with the end of said spring to hold the connector in advanced position, it being noted that the shoulder 223 is located slightly below the normal position of the free end of the spring, so that as the connector is forced rearwardly the spring will be correspondingly depressed until it is permitted to rise into engagement with the shoulder or notch 223.

Next describing the means whereby the actuation of any given connector serves to place it in position to be selected and to be made temporarily an operative member of a positive driving connection, which subsequently serves to actuate the printing and other mechanisms, each connector is provided at its rear end with a hook, as 224, the hooks of the several connectors being arranged to stand in successively lower planes from the connector which corresponds to the numeral "1" and which stands the highest to the connector which corresponds to the numeral "9," which stands lowest. In the particular construction shown herein these hooks are formed upon extensions at the upper edges of the respective bars and project rearwardly, each hook terminating in a downturned extension or lip 225. Inasmuch as the member which serves to engage the several hooks is in the present instance caused to travel in an arc, the said hooks are shown in the present instance as arranged to stand in a corresponding arc, so that when any given connector is shifted rearwardly it may be engaged independently of all of the others of that group. Describing now the particular mechanism employed for selecting and lifting said connectors, 226 designates a main rock-shaft arranged to extend entirely across the machine and journaled at its respective ends in suitable pillow-blocks or journals, (designated as a whole 227 and best seen in Fig. 2.) Said main shaft is provided at a suitable point adjacent to each end with a rigid crank-arm, as 228, said crank-arms being arranged to extend parallel with each other and each provided at its outer end with a rigid stud, as 229, which are severally adapted to engage and actuate two peculiarly-shaped cam-levers, (designated as a whole 230,) which are likewise counterparts of each other and arranged in parallel relation. The cam-levers 230 extend rearwardly to and are journaled upon pivot-studs 231, mounted upon the side frame members in axial alinement with each other. The lower edges of the front end portions of said cam-levers, which are engaged and acted upon by the cam-studs, are of peculiar configuration, the construction being such that when the studs pass into engagement with said levers they first act upon downwardly and forwardly inclined surfaces 231$^a$, thereby imparting a relatively rapid lifting movement to the cam-levers until the latter have reached their uppermost limits of movement, after which the studs pass into engagement with curved cam-surfaces 232, which are so formed as to extend concentric with the axis of the main shaft when the cam-levers have reached their said uppermost limits of movement, so that during the further rocking of said main shaft said cam-levers remain stationary.

Next describing that member which serves to select or pick up those ones of the several groups of connectors which have been actuated or set up for any given operation or recording of items, this device is in the present instance essentially a lifting-bail and comprises a pair of arms, (designated 233,) one at each side of the machine, as best seen in Fig. 2, which are pivotally mounted or connected at their forward ends near the front end of the machine upon suitable upstanding brackets or supports 234, (see Fig. 2,) the pivotal axes of said arms being arranged in alinement with each other and concentric with the pivotal axis of the several connectors. At their rear ends said bail-arms are rigidly connected by means of a cross-bar 235, which is suitably shaped to engage with the connector-hooks 224, being desirably and as shown in the present instance approximately L-shaped in cross-section and provided at the forward edge of its lower flange with an upstanding lip or flange 236, adapted to interlock with the several connector-hooks to hold the latter positively from being retracted by their respective springs 218 after they have been lifted out of engagement with the holding-spring 221 and before they have been intentionally released. A driving connection is provided between the cam-arms 230, hereinbefore described, and the bail member last described, which consists in the present instance of a pair of studs 237, one upon each bail-arm, arranged to project laterally outward from the latter and engaging a corresponding slot 238 in the adjacent cam-arm. The slot-and-stud form connection described is adopted to provide for the necessary relative movement of the parts, owing to their axes of oscillation being located at different points.

The main shaft 226 is provided with a crank-handle 226$^a$ outside of the frame of the machine, whereby it may be oscillated to rock the arms 228 thereof upwardly and forwardly, and it follows from the construction described that when said main shaft is thus oscillated the cross-bar 235 of the lifting-bail will engage and lift all such connectors as have been shifted rearwardly by the operation of a key, and therefore project beyond their normal positions, carrying said connectors upwardly about their pivotal axis until the lifting-bail reaches its uppermost limit of movement. The connectors will therefore be lifted varying distances, depending upon the normal plane of their several lifting-hooks, the units-connectors being lifted a minimum distance and the other connectors proportionately greater distances. In this connection it will be noted that the normal position of the engaging portion of the lifter-bail 235 is below the normal or lowest position of the lowest ones of the connectors, and it follows that upon the return movement of the lifting-bail to its normal position the connectors will successively go into bearing at their lower edges with the plate 217, and be thus arrested and freed from engagement with said lifter-bail. Inasmuch as each connector is shifted rearwardly at the time it is set by the key a sufficient distance to carry the inner side of its lip 225 slightly beyond the inner side of the engaging lip 236 of the lifting-bail, it follows that as soon as the connector has been lifted out of engagement with the holding-spring 221 the connector will be retracted slightly and until arrested by the lip 236, so that upon the return movement of the lifter-bail the holding-spring 221 will not reëngage the shoulder 223 of the connector, and consequently when disengaged from the lifter-bail will be at once returned to its normal position under the action of its retracting-spring 218.

To next describe the connections whereby the lifting of the connectors is made to positively actuate type-carriers, and referring more particularly to Figs. 1 and 2, 300 designates a series of pairs of guide-rods mounted to extend vertically in parallel relation between the cross frame member 4 and a corresponding space plate or support 4$^a$, located at the bottom of the machine and resting upon the base-plate, there being a pair of these guide-rods for each group of keys or order of numerals and the members of each pair being conveniently in longitudinal alinement. Upon each pair of guide-rods is mounted a sliding frame, designated as a whole 301 and consisting in the present instance of a U-shaped member, the upper and lower arms 302 and 303 of which are apertured to fit upon the guide-rods and serve as supports, to which is connected a rack member 400, while the vertical portion 305 of said frame serves to unite said upper and lower members rigidly with each other and serves also as a support for a bracket-like extension 306 at the forward side thereof near the upper end of the sliding frame. Upon the lower portion of each sliding frame 301 is mounted or formed a transversely-extending yoke or channel member 307, which in the normal or lowermost position of said sliding frame stands horizontally opposite the lower portion of the rear ends of the group of connectors pertaining to this particular sliding frame.

Each connector is provided at its said rear end with a knuckle-like extension 308, which is of a vertical width substantially equal to the vertical width of the channel 309, formed in said yoke member, and is adapted when the connector is shifted rearwardly to enter said channel and form a positive driving connection between the connector and sliding frame.

Referring more particularly to Fig. 2, it will be seen that the several brackets 306 of the several vertically-sliding frames 301 are extended laterally from their respective frames, so as to approach the central portion of the machine, at which place the carriers are grouped together as closely as may be in order to record upon a comparatively narrow strip or ribbon. Said brackets 306 are not only extended laterally and upwardly, but also have their extreme ends extended forwardly from the respective carriers, so as to stand in parallel relation, and are also suitably spaced apart to bring the type-carriers into proper relation to indicate the proper periods to distinguish between units, hundreds, thousands, &c. Each bracket serves as a support, upon which is pivotally mounted a vertically-disposed type-carrier, (severally designated 310,) each being pivoted to its corresponding bracket, as indicated at 311, and extending thence upwardly in front of and adjacent to a suitable printing roller or platen 312. Each type-carrier 310 carries a vertically-disposed row of type 313, representing in the present instance the numerals from "0" to "9," inclusive, the numeral "0" being in the normal position of the carrier opposite the printing-point. The type are in the present instance shown as formed or mounted directly upon those edges or faces of the carriers next to the platen; but it is to be understood that the type may be loosely or movably mounted thereon, if preferred. The group of carriers as a whole is normally held retracted a slight distance, so as to permit the inking-ribbon and recording-strip to move freely across the platen conveniently by means of a plate-spring 314, made of sufficient width to act upon all of the group of carriers and suitably mounted upon a cross-bar 315. It will be understood that the extreme distance of travel of each vertically-sliding frame is equal to the length of the vertical row of type upon its type-carrier, or, in other words, sufficient to carry the carrier from its normal position upwardly far enough to bring its lowermost type opposite the printing-point.

Next describing the mechanism whereby the type-carriers are forced into printing impression, with the recording-sheet interposed between said carriers and the platen, it will be understood that this mechanism may be varied without departing from the broader scope of the invention; but in the present invention I have shown an improved mechanism for this purpose, which will be made the subject of claims.

Referring again to Fig. 1 of the drawings, 316 designates a supporting-bar, in the present instance taking the form of a rod and arranged to extend across the central portion of the machine a short distance in front of the type-carriers, the ends of this rod being supported by a pair of brackets 317, mounted upon a cross-plate. Upon the support 316 are mounted a plurality of impression-levers 318, one for each of the type-carriers, these impression-levers being provided with transverse slots at points intermediate of their length, which slots embrace the support 316 and being held in suitable alinement with their respective type-carriers by intervening washers. At their upper ends said impression-levers are curved rearwardly and terminate in rounded nose portions 319, adapted to engage proximate edges of the type-carriers to force the latter rearwardly, while at their opposite or lower ends said impression-levers are provided with cam-surfaces 320, adapted for engagement by a cam member 321, provided with a series of cam-surfaces 322 and in the present instance taking the form as a whole of a bail. Describing said actuating device more particularly, it comprises a pair of arms 323, arranged to extend in approximately horizontal direction rearwardly to and rigidly connected with a rock-shaft 324, while at their forward or swinging ends said arms are connected by means of a transverse bar or bail member 325, upon the outer or forward face of which are mounted or formed cam-surfaces 322, hereinbefore referred to. In the particular instance shown herein these cam-surfaces consist of a series of inclined steps 322, (see Fig. 20ª,) which are arranged in successively lower planes from one side of the series of impression-levers to the other, so that said cam-surfaces act successively or consecutively upon the latter, each step or cam-surface being inclined forwardly and downwardly, so that as the bail rises the lower ends of the impression-levers will be forced outwardly and the upper ends thereof forced into bearing with the type-carriers. Describing now the mechanism whereby said bail is lifted, and referring more particularly to Fig. 2, 326 designates a toggle-arm pivotally mounted at its forward end, as indicated at 327, upon a suitable bracket lug or support and arranged to extend longitudinally and vertically above a crank-arm 328, rigidly mounted upon the main shaft 226, in the present instance adjacent to the arm 228 thereof, remote from the handle end of said shaft. The crank-arm 328 is provided with a wrist or stud 329 and is disposed in such angular relation to the main shaft that during the latter part of the movement of said main shaft in its forward oscillation said stud will engage an inclined cam-surface 330, formed upon the lower edge of said toggle member, (see particularly Fig. 1,) and will force said toggle member upwardly. To the rear end of the toggle-arm 326 is pivotally connected a second toggle member or link 331, which extends upwardly to and is connected with a stud or wrist 332 upon one of the arms 323 of the bail, adjacent to the cross-bar 325 thereof.

Inasmuch as it is desirable that only those type-carriers should be actuated which correspond to the numbers which have been set up by the actuation of the keys, means are provided whereby the impression-levers 318 are rendered functionally inoperative during each operation, except as to such as are necessary to print the required numbers. To this end I provide a shiftable fulcrum member, (designated as a whole 333,) which is adapted to be shifted out of register with those of the impression-levers which are to remain functionally inoperative during each operation. In the present instance said fulcrum member takes the form of a plate provided at its lower side with rearwardly-extending ears 334, which are engaged with and slide upon a rod and support 335, which, as best shown in Figs. 1 and 3, is supported at its ends in suitable brackets 336, formed integrally with a cross-bar or support 337, which extends entirely across the machine and is secured to the front vertical edges of the side frames. At its upper edge the fulcrum-plate is provided with a rearwardly-extending flange 338, the edge of which is rounded and forms the fulcrum proper, against which the impression-levers rest and upon which they oscillate during their functional operation. Upon its lower part said fulcrum-plate is also provided with a rearwardly or inwardly extending finger-like projection 339, and in the normal position of the latter, which is opposite the set of impression-levers, said finger extends into a position transverse to the vertical plane of the front edges of the vertical portions of the brackets 306, which carry the several type-carriers. It is to be noted, however, that in the normal or lowermost position of said bracket members 306 the finger 339 stands just above their upper ends, so that the fulcrum-plate is free to be shifted laterally without engaging said brackets. When, however, these brackets are carried upwardly by the upward movement of the sliding frames upon which they are mounted, they will be carried into the path of the finger 339 and will serve to arrest the latter, and in case several of these brackets are thus elevated that one of said brackets nearest the left-hand side of the machine and which has been operated will arrest the movement of the fulcrum-plate toward the right-hand side of the machine.

Means are provided for shifting the fulcrum-plate upon each printing operation of the machine, such means comprising yieldable connections which tend to shift the fulcrum-plate the full extent of its throw or to a position entirely out of register with the impression-levers, but permitting the fulcrum-plate to be arrested by any one of the brackets 306 in the manner hereinbefore described. In the preferred embodiment shown herein the means for thus shifting the fulcrum-plate comprise a bell-crank lever 340, pivotally mounted at its angle at the right-hand side of the machine and approximately in transverse alinement with the fulcrum-plate, so as to oscillate in a transverse vertical plane, and yieldably connected at its upper end with the fulcrum-plate by means of a coiled contractile spring 341. The lower arm 342 of said bell-crank lever is arranged to project inwardly above an operating-lever 343, which is arranged to rise and act upon said arm 342 during each reciprocation of the main shaft. To this end said operating-lever 343 is in the form of a bar, which extends forwardly to and is pivotally mounted upon a bracket 344 (see Fig. 2) and is provided at a point intermediate its length upon its lower edge with an inclined cam-surface 345, adapted to be engaged by a stud or pin 346, mounted upon the crank-arm 228 at that side of the machine. The position of the inclined cam-surface 345 relatively to the throw of the crank-arm is such that the lever 343 will not be actuated until after all of the type-carriers and the brackets which carry the latter have been moved upwardly far enough to carry them within the path of the finger 339. In other words, the movement of the lever 343 occurs almost at the end of the movement of the crank-arm 228 in its advance movement. The result of this construction is that upon each recording or printing operation of the machine the fulcrum-plate will be withdrawn or carried out of register with all of those impression-levers 318 which are to the left of the key of highest order operated, and when the actuating-cams 322 are carried upwardly to oscillate the impression-levers those of the latter from behind which the fulcrum-plate has been drawn will simply swing outwardly on the guide-bar or support 316 by reason of their slotted connection therewith and will not be brought into operative bearing with the carriers. In order that the fulcrum-plate 333 may be returned to its normal position, a slotted actuating-bar 340ª is pivotally connected with the upper end of the angle-lever 340, the slot of which bar engages a suitable stud 333ª upon the fulcrum-plate and operates to positively return said plate with the return movement of the lever. A coiled spring 341, connecting the upper end of the lever 340 with the cross frame member 337, operates to return the lever 340 to its normal position. In order to hold the impression-levers 318 in a normally retracted position, each of the latter is provided with a spring, as 347, suitably secured to its front side and arranged to bear against a cross-rod or support 348, carried by extensions of the brackets 317.

Inasmuch as the springs 347 coöperate with the cam-bar 321 to thrust forward idly those impression-levers from in front of which the fulcrum-plate has been withdrawn, it is necessary to provide for returning said impression-levers out of the path of the fulcrum-plate in the return operation of the latter. This is accomplished by beveling the edge of the fulcrum-plate, as indicated at 338ᵃ in Fig. 21, so that it rides over the impression-levers show fashion and returns them to their normal positions during the return movement of the fulcrum-plate.

In order to adjustably support the upper portion of the fulcrum-plate 333, I desirably provide a supplemental plate 349, adjustably mounted upon the cross-bar 337 and secured thereto by means of adjusting-screws 350, the lower edge of said plate being provided with an inwardly-extending flange or bead 351, which forms a fulcrum which rests against the cross-bar 337, while its upper edge is provided with a somewhat similar bead or bearing-rib 352, which forms the fixed point or bearing against which the fulcrum-plate rests. Obviously by adjusting the screws 350 inwardly or outwardly the upper portion of the fulcrum-plate will be advanced or retracted accordingly and the throw of the impression-levers correspondingly varied.

The particular mechanism whereby the recording-strip is supported and fed around the roller-platen 312, hereinbefore referred to, to receive the impressions of the type forms no part of the present invention, but, on the contrary, forms the subject-matter of a separate application filed contemporaneously herewith, Serial No. 95,345, and will therefore be but briefly referred to herein. Said mechanism comprises a feed-roller 353, which is suitably driven step by step in the usual manner and serves to draw forwardly the recording-strip 354, which passes between said feed-roller and the impression-roller, the supply end of the recording strip or sheet being held by a traveling carriage designated as a whole 355 and which is mounted to slide forward upon a pair of guide-bars 356, suitably supported in the upper portion of the framework in horizontal and parallel position.

357 designates the inking-ribbon, the position of which is merely indicated and which may be supported in operative position by means of any preferred ribbon mechanism.

The accumulator and carrying mechanisms forming parts of the present machine are also made the subject of a separate application filed contemporaneously herewith, Serial No. 95,344, and reference is made to said application for a specific description of these mechanisms. Inasmuch, however, as an understanding of the construction and operation of these mechanisms will contribute materially to a full comprehension of the features of invention described and claimed in the present application, the following description is added, which is made sufficiently comprehensive to enable these mechanisms to be understood.

400 designates a series of racks which, to economize space, are mounted in offset relation one upon each of the sliding frames 301, so as to move up and down with the latter. 401 designates a transversely-extending cross-bar mounted to have a limited endwise or transverse movement, being to this end provided at each end with longitudinally-extending slots 402, (see Fig. 3,) which engage supporting-studs 403 upon the main side frames.

404 designates a second transversely-extending support or bar rigidly mounted to extend between the main side frame members in parallel relation to the support 401. Within these two supports is mounted a series of accumulator-shafts 405, one for each of the several racks 400, carried by the vertically-sliding frames, these accumulator-shafts being journaled at their rear ends in the support 404 in bearing-apertures 406, which are sufficiently elongated or loose to afford a slight swinging movement of the opposite ends of the shafts in a lateral direction. The forward ends of the accumulator-shafts are loosely journaled in the supporting-bar 401 and are provided at their extreme forward ends with pinions 407, respectively arranged to mesh with the several racks 400.

Upon each accumulator-shaft is mounted an accumulator proper, (designated 408,) preferably and as herein shown taking the form of a drum or cylinder provided with a spirally-arranged series of radially-extending lugs or projections 409, corresponding in number to the several digits and spaced at uniform angular distances apart around the circumference of the drum with the exception of one space or interval which is left blank and which corresponds with the "0" in the series of digits.

The several accumulators are splined upon the accumulator-shafts. In order to insure their movement together back and forth along the accumulator-shafts, a confining-frame is provided, comprising front and back bars 410 and 411, mounted upon the accumulator-shafts adjacent to the ends of the accumulators and united at their ends by means of integral tie portions 412, as best seen in Fig. 2. The object of so mounting the forward ends of the accumulator-shafts in the support 401 that the series of shafts may be moved bodily and together is in order to throw the pinions thereof into and out of mesh simultaneously with their respective racks, it being understood that during one movement of the sliding frame the racks are engaged with the pinions and advance or rotate the accumulators an angular distance proportionate to the distance of travel of the respective sliding racks, while upon the opposite movement of the latter the pinions are thrown out of mesh, so as to leave the accumulators standing in the several positions to which they have been rotated.

Describing next the mechanism for automatically and positively shifting the accumulator-shaft pinions into and out of mesh each time the main shaft is operated, and referring more particularly to Figs. 2 and 3, 413 designates a rock-shaft journaled in vertical position to extend between the frame members 4 and 4ª and provided at a point intermediate its length with a rearwardly-extending rigid finger or projection 414, which extends between the forks of a depending bracket 415, mounted rigidly upon the reciprocatory bar 401. Upon the lower portion of the rock-shaft is mounted a second peculiarly-shaped bracket 416, which is adapted to be acted upon by the extreme end of a lever 417, which extends from a point opposite the rock-shaft forwardly to and is pivoted upon the bracket 344, hereinbefore described. The lever 417, as best seen in Fig. 6, is of peculiar shape, being provided at a point intermediate its length with an upwardly-arched portion 418, the lower edge of which forms a cam-surface. The cam-surface last referred to is adapted to be engaged by the stud 346, mounted upon the crank-arm 228 at the right-hand end of the main shaft and hereinbefore referred to, and is so shaped as to impart a peculiar and intermittent movement to the lever 417 during the operation of the main shaft. To this end an approximately horizontally extending cam portion 419 is provided at the rear end of the upwardly-deflected or arch-shaped portion of the lever, which imparts an initial lifting movement to the lever, and immediately contiguous to this portion 419 is formed a cam portion 420, which is concentric with the axes of the main shaft when the lever has reached the end of its initial movement, thereby providing for a dwell in the movement of the lever 417 until the stud 346 reaches an inclined cam portion 421, when it is again lifted a short distance, the cam-stud finally passing into engagement with a second concentrically-curved portion 422, which permits the lever to remain stationary during the remainder of the advance stroke of the crank-arm and until the latter has returned to the inclined portion 421. The intermittent lifting of the lever 417 is so timed as to bear a definite relation to the operation of other parts of the mechanism, as will hereinafter appear.

In the operation of the machine when printing the successive items the pinions of the accumulator-shafts are thrown into mesh with their respective racks at the beginning of the upward movement of the crank-handle, so that the accumulators are rotated during the advance movement of the main shaft. To accomplish this, the extreme end surface of the timing-lever 417 is made inclined, as indicated at 423, and the bracket member 416 is provided with upper and lower cam projections 424 and 425, separated by an interval or opening 426, which fingers or projections are adapted to be acted upon by the inclined cam-shaped end of the timing-lever to oscillate the rock-shaft in a direction to throw the accumulators into mesh against the tension of a spring 427, tending to normally hold them in disengaged position. The lower finger 425 of the bracket is somewhat shorter than the upper finger 424, and the end of the lever normally stands in position to engage the extreme end of said lower finger, so that upon the initial upper movement of the timing-lever the lower finger will be engaged and the accumulators thereby thrown into mesh, the dwell of the lever 417 permitting the latter to rest in holding engagement with the finger 425, and thus retaining the racks in mesh during the full upper movement of the sliding frames and connected racks. Upon the secondary upper movement of the lever 417 the end thereof passes out of engagement with the lower finger of the bracket and into the recess between the upper and lower fingers, or, in other words, does not engage the depending portion of the upper finger of the bracket, and as soon thereafter as the lever passes out of engagement with the lower bracket-finger upon its upward movement the rock-shaft is freed and the spring acting upon the group of accumulators throws them out of mesh. Upon the return movement of the lever the lower edge of the latter strikes the downwardly and outwardly inclined upper surface 428 of the lower bracket-finger, and is thereby forced over the end of the finger cam-fashion, it being understood that the lever is of resilient material, so as to be capable of yielding laterally for this purpose and another purpose, which will now be explained. In order to insure the positive return of the lever to its lowermost position, a lip 429 is provided at its lower side in position to be engaged by the stud 346 as the latter approaches its limit of downward return movement.

When the total is to be printed, the operation is accomplished by actuating the sliding frames through the medium of the accumulators, and in this case the accumulators are held out of mesh during the upward movement of the sliding frames and racks and thrown into mesh with the latter upon the return or downward movement for the purpose of clearing or returning the accumulators to their zero positions. In order to accomplish this latter movement, mechanism is provided as follows: Referring to Figs. 1 and 5, 430 designates a total-key generally similar to the numeral-keys arranged at one side of the latter, as best indicated in Fig. 5, and likewise arranged to act upon a bell-crank lever 431, pivotally mounted upon a suitable standard or bracket 432. The end of the lower arm of the lever 431 is pivotally connected with an actuating-bar 433, which extends longitudinally and rearwardly to the rear end of the machine, at which point it is connected with a depending link 434, rigidly mounted upon a suitable support 435, which is in turn pivotally mounted between the main side frame. At a point intermediate its length and approximately transversely opposite the rock-shaft 413 said actuating-bar is provided with a wedge-shaped cam projection 436, which is arranged to act upon an upstanding arm 437 to force the same laterally during the forward movement of said actuating-bar or that movement produced by depressing the total-key 430. The arm 437 has a lower horizontal extension 437ª, which is secured to or formed as a part of a transversely-extending bar or rod 438, which is guided in suitable ways or bearings in the lower part of the main frame and is provided at its opposite end, or at that side of the machine remote from the actuating-bar 433, with a forwardly-extending arm 439, (see Fig. 2,) which terminates in an upstanding portion 440, (see Fig. 6,) which extends inside of and adjacent to the free end of the lever 417. When the rod 438 is shifted endwise through the action of the cam projection 436, the upstanding arm 440 forces the yielding end of the lever 417 outwardly far enough to carry it out of alinement and permit it to pass the lower bracket-finger 425 during the initial upward movement of the lever. Upon the secondary upward movement of the timing-lever, however, the end of the same engages the depending portion of the upward bracket-finger and oscillates the rock-shaft so as to throw the pinions and racks into mesh, it being understood that this secondary movement occurs just after the completion of the upward movement of the sliding frames. Upon the return movement of the main shaft it is to be noted that the timing-lever remains in its uppermost position by reason of its frictional engagement with the bracket-finger until the cam-stud 346 on the crank-arm engages the lip 429, and thus carries the lever positively downward; but before this latter engagement takes place the sliding frames will have reached their lowermost positions and the accumulators have accordingly returned to zero. A description of the mechanism and operation thereof by which the totals may be taken from the accumulators by the movements last described is now in order.

The normal position of the accumulators upon their several shafts is that shown in Fig. 1, in which position they are shown at the limit of their forward movement. Immediately below each accumulator when in its normal or forward position is mounted a sliding rack-frame, (designated as a whole 441,) which is supported to slide longitudinally upon pairs of guide-bars 442, secured at their ends to transverse bar members 443 and 444, it being understood that there is one of these rack-frames for each accumulator and that they are free to move independently of each other. Upon the lower side of each rack-frame is mounted a rack 445, which is arranged to intermesh with an intermediate segment 446, the several intermediate segments being journaled upon a suitable transverse shaft 447, having its ends supported in suitable brackets 448, rising from the base-frame, as best indicated in Fig. 1. Each segment is also arranged to intermesh at its lower part with a rack 449, formed or mounted upon the rear side of the corresponding sliding frame 301, so that movement of the rack-frames 441 is positively transferred to the respective sliding frames. Upon each rack-frame 441, at the rear part thereof, is formed or mounted an upstanding lug 450, which is vertically beneath the axis of the corresponding accumulator and is adapted to contact with or be engaged by whichever one of the spirally-disposed lugs of the accumulator which happens to be extending vertically downward. The position of the lug 450 is normally just in rear of the rear end of the accumulator, from which it follows that when the accumulators are shifted rearwardly the several lugs 450 will be engaged and the rack-frames carried rearwardly a distance exactly proportional to the relative positions of the several lugs of the accumulators thus brought into engagement—that is to say, the lugs upon the accumulators are spaced apart such distance as to impart movement to the sliding frames, and consequently to the type-carriers connected therewith, a movement equal to the distance between type-numerals of the carrier, so that if the rearmost lug of an accumulator is in alinement with the stud 450 of the sliding rack-frame the type-carrier will be elevated the full distance of its throw and accordingly brought into position to print the numeral "9." Next describing the means whereby said accumulators are shifted rearwardly for the purpose described, 451 designates a pair of arms, one at each end of the confining-frame inclosing the accumulators and rigidly mounted in parallel relation upon a rock-shaft 452, journaled transversely in the lower part of the main frame, conveniently in the lower part of the brackets 448. Each arm 451 is provided at its upper end with a fork or slot 453, which is arranged to embrace and engage a stud 454, mounted upon the corresponding end of the confining-frame referred to, so that motion imparted to the rock-shaft serves to shift the accumulators positively and uniformly. In order to actuate said arms 451, one of the latter is conveniently provided with a forwardly-extending wing or finger 455, which projects forwardly alongside one of the cam-levers 230, in the present instance that one at the remote side of the machine as seen in Fig. 1. Upon said cam-lever 230 is mounted a stud 456, which is in position to engage the lower edge of the wing and force the latter upwardly when said cam-lever is oscillated, provided the wing is shifted into vertical alinement with said stud, as now to be described. Normally the wing 455 stands in a position out of vertical alinement with the stud 456, and in order to force it laterally into alinement with the stud at the time a total is being taken the same arm 437 which is acted upon by the inclined cam projection 436 is extended above said cam projection a sufficient distance to engage the outer side of the wing, and force the latter over with said arm. Movement is imparted to the cam-levers 230 by means of the main crank-shaft acting through the crank-arm 228 and stud 229, as hereinbefore fully set forth.

From the foregoing description it will be obvious that the type-carriers will be caused to print the numerals which correspond to the position of the lugs 409 of the respective accumulators which are in register with the lugs of the several rack-frames 441 at the time the total is taken. It will be obvious, however, that a transfer or carrying mechanism must be provided of some kind for coöperating with the accumulators in order that the latter should be brought into proper position in order to so correct totals.

The mechanism shown and described herein is novel and is made the subject of claims in a copending application, Serial No. 95,344, but will now be described herein.

Referring more particularly to the rear end elevation view, Fig. 4, upon the end of each accumulator-shaft is rigidly mounted a ratchet-wheel 500, which ratchet-wheels, it will be noted, are of such diameter relatively to the spacing apart of the accumulator-shafts that their peripheries are closely contiguous, but do not interfere with each other. Each ratchet-wheel is provided with ten teeth or ratchet-shoulders corresponding to the digits of each order, and likewise each ratchet-wheel is provided with a single stud, as 501, mounted near the peripheries of the wheels and projecting outwardly or in a direction parallel with the axes of their shafts. Upon the main frame, above the ratchet-wheels, is secured a supporting-plate 502, which forms the support upon which is mounted the actuating mechanism now to be described, said plate being provided in its upper and lower edges with a series of guide-recesses 503, arranged in vertically-disposed pairs, a pair of these guide-recesses being provided in vertical alinement with the space between each contiguous pair of ratchet-wheels. Upon the plate 502 is also mounted a series of sliding pawl-supports 504, each consisting of a plate slightly wider than the width of the guide-notches and provided at each end with an inturned integral lug or guide member, as 505 and 506, engaged with the upper and lower guide-recesses. The lugs 505 and 506 are spaced apart far enough to provide for a limited vertical reciprocation of the pawl-supporting plates upon the support 502, and the lower lugs 506 project inwardly beyond the inner face of the support 502 and are there severally connected with coiled contractile springs 507, supported upon lugs 508 upon the inner face of the plate 502 and tending to normally hold the pawl-supports at their upper limits of movement. Upon the outer or rear face of each pawl-support is pivotally mounted a push-pawl 509, which is pivoted so as to oscillate in a transverse plane and is adapted to act upon the subjacent ratchet-wheel to step the latter forward when the pawl-support is depressed in the following manner: Adjacent to each pawl-support and at the left-hand side thereof as viewed from the rear is pivotally mounted a pawl-setting lever 510, which is arranged to depend at its lower end into the path of rotation of the corresponding stud 501 of the ratchet-wheel vertically beneath the same, while at its opposite end it is arranged to extend across the pawl-supporting plate into position to engage the pawl thereon to swing the same toward the right as viewed from the rear, in which latter position the end of the pawl is brought into position to engage and advance the ratchet-wheel one tooth when the pawl is shifted downwardly. The pawls are so mounted upon their pivotal supports as to be frictionally held in whatever position they are left, so that after any given pawl has been thrust over into position to act upon its ratchet-wheel by the engagement of the stud of the ratchet-wheel of next lower order with the lower end of the corresponding pawl-shifting lever 510 it will remain in this position until the next printing operation, as will hereinafter appear. It will be noted that in the normal positions of said pawls they stand in such position as to pass between the adjacent ratchet-wheels without advancing the latter, so that it is only those pawls which have been set by the action of the pawl-shifting levers 510, as hereinbefore described, which act upon the corresponding ratchet-wheels. It will be further noted as to these latter pawls the rotation of the ratchet-wheel under the action of the pawl serves to return it to its normally vertically depending position, so that upon succeeding operations it will not actuate the ratchet-wheel unless it has again been reset. It may also be noted at this point that the relations of the adjacent ratchet-wheels to each other are such that when the pawl reaches its limit of actuating movement between the latter both adjacent ratchet-wheels will be positively locked against further rotation by reason of the fact that the pawl practically occupies the entire space or is inserted wedge fashion between the two. This is a feature of much importance, inasmuch as it positively prevents overthrowing of the ratchet-wheels and the accumulators connected with the same shafts.

Describing now the mechanism whereby the pawls are actuated and referring more particularly to Fig. 1, 511 designates a rock-bar journaled at its ends in the main side frames of the machine to extend transversely across the latter and carrying at one end a depending arm or crank 512, upon which is mounted a wrist or stud 513. 514 designates an oscillatory arm pivotally mounted at its lower end as engaged at 515 to a suitable bracket upon the base-plate and provided at its upper end with a fork or slot 516, operatively engaging the stud 513. 517 designates an actuating-bar connected with the arm 514 at a point intermediate the length of the latter and extending thence forwardly to a point vertically above the main shaft and provided in its forward end with a long slot 518, which is operatively engaged with the stud 329 of the crank-arm 328. The length of the slot 518 is such as to afford considerable lost motion, so that the oscillatory arm 514 is drawn forward a short distance only during the advance movement of the main shaft, and this movement occurs practically at the end of the said advanced movement of the main shaft. The return movement of the oscillatory arm is likewise imparted just at the end of the return movement of the main shaft.

Referring more particularly to plan view Fig. 2, 519 designates a series of levers, one for each of the several accumulators, arranged to extend longitudinally of the machine and journaled at their forward ends upon a cross bar or shaft 520, said levers being conveniently spaced apart, so as to be held in register with the several lugs 406 of the pawl-supports by means of spacing-sleeves 521. Each lever at its rear end rests upon the corresponding inwardly-extending lug 506 of one of the pawl-supports, so as to depress the latter when the lever is depressed. At a point intermediate its length each lever 519 is provided with a stud 522, and the rock-bar 511 is provided with a corresponding series of cam-wings 523, severally adapted to engage the studs 522 and force downwardly the levers when the rock-bar is oscillated by means of the arm 514, as hereinbefore described. The cam-wings 523 are disposed in different angular relation to the axis of the rock-bar 511, each wing from the right-hand side or units order toward the opposite side being behind the preceding one relatively to the forward direction of movement of the rock-bar, so that the levers 519 are depressed consecutively. The object of this arrangement is to insure a proper carrying from one accumulator to the next. For example, if all of the accumulators should happen to stand in position to record the numerals 9 the addition of one unit would necessitate the carrying across the entire series, and by reason of their consecutive operation this would be properly accomplished. The shape of the cam-surfaces 524 of the several wings is such as to impart a relative rapid downward movement to the levers and to thereafter retain the latter depressed during the entire advance movement of the rock-bar. The springs 507 acting upon the pawl-supports obviously return the levers and hold them in their normal upper positions.

After the total has been taken the accumulators are thrown into mesh with their respective racks, while the rack-frames are in the positions occupied during the printing of the total, and upon the return or downward movement of the rack-frames the accumulators are therefore returned to zero, as hereinbefore described. It will be obvious that this necessitates a reverse rotation of the accumulators and the ratchet-wheels mounted upon their respective shafts. In practice it is desirable to provide centering-pawls 525, which are mounted to reciprocate vertically in suitable bearings 526 and 527 upon the main frame vertically beneath the respective ratchet-wheels and arranged to act upon the latter to insure the accurate stopping of said wheels to bring their several lugs 409 in exact alinement with the engaging lugs of the sliding rack-frames 441. In order to retract these centering-pawls during the operation of clearing or returning the accumulators to zero, the support 435, upon which the depending link 434 engaged with the actuating-bar which transmits motion from the total-key dismounted, is in the form of a rock-bar journaled between the main side frames of the machine, and upon this rock-bar is mounted a series of fingers 528, which project rearwardly and engage collar-like projections 529 upon the centering-pawls, hereinbefore referred to, and operate to depress the latter when the total-key is depressed against the tension of spiral springs 530, interposed between said projections 529 and the lower guide-supports 527 of said pawls.

As hereinbefore stated, the present invention includes certain improvements in the construction and arrangement of the keyboard, which while specially applicable to the present type of machine may nevertheless be employed in other connections.

Referring more particularly to Fig. 1, 600 designates as a whole a base-board, which is arranged to cover the underlying key mechanism and is preferably inclined upwardly and rearwardly in the usual manner to facilitate the operator's view of the keys. Through the keyboard, which is suitably supported upon the main frame or casing, are arranged to extend the staffs 601 of the keys, the lower ends of these staffs being provided with contacting portions 602, adapted to engage the respective key-levers 206, hereinbefore described. In the preferred construction shown the said base-board 600 forms the guide through which the key-staff reciprocates, and to this end it is made of substantial thickness, as indicated in the drawings, so that the guide-apertures 603 therethrough serve to accurately guide and confine the keys. Preferably, and as shown herein, the several keys are of sheet metal struck out by means of suitable dies to form the flat-bar-like staff portions 601, horizontally-extending contact portions 602, and bent-over or horizontally-extending key-tips 604, all in one integral piece. The key-tips are of peculiar and novel construction, being constructed in the form of rings, as best indicated in plan view, Fig. 5, which ring members are suitably rounded at their upper sides and particularly at their inner upper portions, so as to comfortably accommodate the finger-tips of the operator. The object of thus constructing the finger-tips in ring form is twofold—namely, to facilitate a clear inspection of the keyboard thereunder, but more particularly in order to provide a better and larger surface contact for the ends of the operator's fingers with the keys, so as to improve the touch—that is to say, this ring form of key-tip prevents the greater part of the pressure of operating the key from coming upon what amounts to a single point from the center of the operator's finger-tip, and consequently improves the touch and at the same time prevents the key from becoming disfigured and soiled by use. In order to enable the operator to determine at a glance the character of the key, notwithstanding the key-tip is of ring form, and therefore unsuitable for the application of a character designating the key thereto, I provide numerals adjacent to certain rows of keys sufficient to indicate the character of all of the keys, as indicated clearly in Fig. 5. As a still further improvement I separate the keys into groups representing the different periods by means of marginal or outlining strips or frame members, (designated 605.) In the case of an adding-machine of the character referred to the first two rows at the right-hand side of the machine are inclosed in one portion of the outlining-frame, thereby indicating that these two rows belong to the units and tens order, while the remaining periods are divided into groups of three rows each or, as in the present instance, where only seven orders are provided for, they will be divided in accordance with the periods represented. Practically these metal strips or outlining-frames are made of clearly-distinguishable material, so that the operator discerns the character of the key without reference to its particular location, but rather by its relation to the outlining-frame, while the numerals which are placed upon these outlining-frames designate the members of the respective keys.

The operation of the machine constructed as hereinbefore described may be briefly described as follows: The recording sheet or strip being in printing position, the operator proceeds to set up the first item to be recorded by depressing keys to correspond numerically with the item to be recorded, it being noted that the "0" of any item will be printed automatically without the manipulation of any key. The depression of any key operates to shift forward that one of the connectors connected therewith, which connector will be automatically engaged and held by the spring-detent 221 in said position. Should the operator make any error in setting up the item or for any other reason desire to change the numbers before printing, the depression of another key belonging to the same order or group of connectors will not only set forward the correct connector, but will at the same time automatically release the previously-operated connector and allow it to return to its normal position. Having thus set up the item, the operator next turns the main shaft by means of the crank-handle, whereupon the following operations occur: The initial movement of the main shaft acting through that one of the crank-arms 228 which acts upon the lever 417 operates the latter to rock the rock-shaft 413 in the manner hereinbefore fully described, and thus throws the accumulator-pinions into mesh with the several racks of the type-carrying frames 301, it being noted that this operation of throwing into gear is completed before the studs 229 of the crank-shafts 228 engage the cam-levers 230. The further movement of the crank-arms 228, acting upon the said cam-levers 230, impart a relatively rapid movement to the latter, which in turn lift the lifting-bail 235, and the latter picks up or engages all of the connectors which have been placed in said position. The several connectors by reason of their engagement with the corresponding type-carrying frames operate to lift the latter to predetermined heights corresponding to the distance of travel imparted to each connector, it being noted that the lifting-bail has a predetermined and fixed extent of travel. The lifting of the several type-carrying frames in the manner described carries the type-bars thereof into proper positions to bring the type-numerals corresponding to the numerals set up on the keys into printing position. The type-carrying frames having been fully lifted, the cam-studs 229 of the crank-arms pass into engagement with the concentrically-curved cam portions of the cam-levers, thereby permitting the latter to remain stationary during the remainder of the forward-and-return movement of the crank-arms beyond this point. Immediately following the arrival of the lifting-bail at its uppermost position the wrist 329 of the crank-arm 328 of the main shaft passes into engagement with the cam-surface 330 of the toggle-arm which actuates the impression mechanism, and upon the forward movement of the main shaft said toggle is lifted, thereby forcing the cam-bar 321 upwardly into operative engagement with the impression-levers 318 and through the latter forcing the type-bars into printing engagement with the platen. At about the same time that the type-carriers reach their printing positions the stud 329 of the crank-arm 328 at the right-hand side of the machine engages a cam-shoulder 345 on the lever 343, which operates upon the angular lever 340, (best shown in transverse sectional view, Fig. 3,) thereby oscillating the upper arm of said lever outwardly and through the medium of the coiled spring 341 drawing the fulcrum-plate 333 toward the right. The movement of the fulcrum-plate in this direction will be arrested by its engagement with that one of the brackets of the type-carrying frames which belongs to the numeral of highest order which has been set up for the particular item to be printed, thereby rendering inoperative all impression-levers and type-bars of higher order, as hereinbefore fully set forth. Upon the continued forward movement of the crank-arm 228, which engages the lever 417, which controls the throwing into and out of mesh of the type-carrying frames with the accumulator-pinions after the type-carrying frames have reached their upper limit of movement, the said lever 417 is given its secondary upward movement by the engagement of the cam-stud 346 with its cam-surface 421, thereby carrying the end of said lever out of engagement with the lower finger of the bracket member 416, and thus permitting the pinions of the accumulators to be thrown out of mesh with the rack-frames under the tension of the spring 427. Upon the return movement, therefore, of the type-carrying frames the accumulators remain stationary. The return movement of the main shaft restores or permits the other parts, which have been actuated as described, to return to their normal positions, and it is to be noted in this connection that as the lifter-bail 235, which is engaged with the connectors, descends the latter will be arrested by engagement of their lower sliding surfaces 216 with the supporting-plate 217 before the bail reaches its normal position, and thus disengaged from the latter. As soon as the connectors are disengaged from the bail they are instantly returned to their normal positions by the tension of the several springs 218 thereof.

To next describe the operation of taking totals, assuming that a plurality of items have been transferred to the accumulators by the repeated operation of the vertically-sliding rack-frames, the operator depresses the total-key, (shown at the left of the bank of keys,) thereby drawing forwardly the reciprocatory bar 433 connected therewith and causing the cam projection 436 upon said bar to act upon the transversely-reciprocatory shaft 438 to change the position of the timing-lever 417, so that during this initial upward movement it will pass by the lower finger of the rock-bar bracket and during its secondary upward movement will engage the upper finger of said bracket and throw the vertically-sliding rack-frames into mesh with the accumulator-pinions at the end of the forward movement of the main shaft. The same depression of the total-key operates to withdraw the centering-pawls from the ratchets of the carrying mechanism, thus freeing the accumulator-shafts preparatory to the clearing rotation of the accumulators. The same operation of the total-key which causes the reciprocatory bar 343 to shift the transverse bar 438, also acting through the medium of the upstanding arm 437 of said transverse bar, moves the wing 455 pertaining to the arm 451 into position to be engaged by the studs 456 of the main cam-lever 230 at that side of the machine, and the arm 451, by reason of its engagement with one end of the confining-frame of the accumulators and by reason of the engagement of the corresponding arm at the opposite side of the machine and rigid with the rock-shaft 452, operates to shift the gang of accumulators rearwardly as the said cam-lever 230 is raised. As the group of accumulators are thus carried rearwardly upon their supporting-shafts those ones of the contacting points or projections 409 which are in register with the upstanding contact members 450 of the several horizontally-sliding rack-frames 441 engage said upstanding members and carry the sliding rack-frames rearwardly distances exactly proportional to the position which the engaging studs of the several accumulators occupy relatively to the full endwise travel of the accumulators. The horizontally-sliding rack-frames by reason of their driving connections with the vertically-sliding type-carrying frames through the several intermediate segments 446 obviously operate to carry the several type-bars into printing positions to print numerals corresponding to the angular positions of the several accumulators. As the timing-lever 417 is given its secondary upward movement by the engagement therewith of the cam-stud 346 its inclined end 423 engages the bracket member 424, and thereby shifts the accumulator-pinions into mesh with the vertical sliding racks in the manner heretofore fully described, it being remembered that the inclined end of the timing-lever is forced out of alinement with the lower bracket 425 during its initial upward movement during the taking of totals by the action of the cam 436 on the endwise-shiftable bar 438 and arms connected with the latter.

The operation of the carrying mechanism will now be explained; but it will be understood that the carrying mechanism is operated upon each recording operation of the machine for printing items, so that the positions of the accumulators when totals are taken are modified by the action of the carrying mechanism thereon.

As hereinbefore described, in the ordinary addition of items each time the vertically-sliding rack-frames are moved upwardly they turn the several accumulator-shafts forward. The ratchets upon the several accumulator-shafts are each provided with the studs 501, as hereinbefore described, which as each accumulator-shaft completes a revolution engages the oscillatory pawl-setting lever of the pawl of next higher order and forces the latter over into position to engage its ratchet upon the next recording operation of the machine. Describing the operation of the mechanism which effects the actual carrying, upon the advance or forward movement of the main shaft the stud or pin 329 of the crank-arm 328, which is engaged with the slotted lever, acts to draw the latter forward a short distance just at the end of the forward stroke of the main shaft, and this lever or actuating-bar by reason of its connection with the oscillatory arm 514 oscillates the rocking cam-bar 511. The cams 523 thereupon act upon each of the levers 519, which engage the several sliding pawl-supports, thus depressing all of the pawls of the series, it being noted that the pawls will be depressed consecutively from the right side of the machine to the left. It will be noted that those pawls which have not been shifted over will simply pass down between the two adjacent ratchets idly and without acting upon their respective ratchets. The return of the rocking cam-bar and the parts operating the latter is accomplished positively by the return of the main crank-shaft.

The manner of feeding the paper around the impression-platen is entirely obvious, but may be briefly described, and in this connection it is to be understood that any other suitable means may be adopted for feeding the paper step by step upon each recording operation.

Upon the slotted actuating-bar 517 at a point intermediate its length is mounted a stud 531, which upon the return or rearward movement engages a cam-lever 532, suitably pivoted adjacent thereto upon the main frame and carrying a pawl-arm 533, which extends vertically up to and engages a ratchet 534 upon the lower feed-roller 353, hereinbefore referred to. The forward movement of the slotted actuating-bar permits the oscillatory lever to descend to retract the pawl-arm and engage a succeeding notch, the pawl-arm being held in yielding engagement with the ratchet by means of a coiled spring 535. It follows from the foregoing construction that the paper will be fed forwardly a step immediately succeeding each printing operation.

It will be seen from the foregoing description that a machine embodying my invention attains the several objects hereinbefore mentioned in a simple, direct, and practical manner. The positive character of the machine throughout its entire mechanism is a feature that is not to be underestimated. Heretofore the term "positive" has been applied to various adding-machines, which did not in any correct sense answer the term; but in the present instance it will be noted that the actuation of every part upon which in any sense depends the accuracy of results is absolutely positive. It will be seen that a machine embodying my invention may be constructed containing any number or order of numerals, since each group of mechanism for any given order is substantially complete in itself and in a sense independent in its action. It will also be seen that the several cooperating mechanisms are so constructed and disposed as to afford the greatest facility for freedom of movement, for inspection and other manipulation, and, nevertheless, compact and simple. It will be further seen that the manipulation required of the operator in adding is reduced to a minimum, and it is especially to be noted that the operator may move any part as abruptly or suddenly as he may choose without overcoming any retarding device, without the possibility of causing the machine to operate erroneously, and without liability of injuring the machine. In other words, the speed of the machine depends absolutely upon the capability of the operator and is not controlled by any structural limitation.

That feature of the machine which enables the printed record to be exposed immediately following its production is important, since it enables the operator to ascertain at a glance whether he has correctly set up the item, as well also as what the totals are, which of course he cannot know until he sees, and this feature, therefore, very greatly contributes to the utility and practicability of the machine.

While I have herein shown and described what I term to be preferred embodiments of the various structural features of the machine, yet it will be understood that these structural features and the features of arrangement may be very considerably modified without in any sense departing from the spirit of the invention. It is also to be understood that the various terms employed in designating the elements of construction are to be construed generically, except to the extent that they are employed in specific claims. I have not herein attempted to specify or point out possible modifications, for the reason that they are many; but, nevertheless, I wish the invention to be understood as not in any sense limited to the constructions shown except to the extent that such specific details are made the subject of claims.

I claim as my invention—

1. In a calculating-machine, the combination with a recording mechanism and actuating mechanism therefor, of a connector for temporarily connecting the actuating mechanism with the recording mechanism, comprising a member having two engaging parts respectively adapted for engagement with said coöperative mechanisms and movably mounted so as to be capable of compound movement, a key and operative connections between the connector and key, whereby said connector may be initially shifted into operative connection and thereafter move with the connected parts, for the purpose set forth.

2. In a calculating-machine, the combination with a recording mechanism and an actuating mechanism for operating said recording mechanism, of a connector adapted to form a positive driving connection between said coöperating mechanisms comprising a member provided with two engaging parts, one of which is constructed to form an interlocking engagement, mechanism for imparting movement to said connector to shift it into engaged position and guide-supports constructed to permit a compound movement of the connector whereby the latter may first be shifted into engaging position and thereafter move with the engaged parts, for the purpose set forth.

3. In a calculating-machine, a connector provided with a plurality of engaging members, means supporting said connector and arranged to afford a bodily shifting and pivotal movement of the latter, and means for actuating the connector, comprising key connections for setting the connector and mechanism for subsequently operating the connectors, for the purpose set forth.

4. In a calculating-machine, the combination of a series of connectors and an actuating device common to all of the series, said connectors being each provided with an engaging member which members are in their normal positions successively more remote from the normal position of said actuating device, and keys for operating said connectors independently of each other.

5. In a calculating-machine, the combination of a group of connectors representing an order of numerals, keys for individually actuating said connectors and an actuating device common to all of said connectors, each connector being provided with two engaging portions forming two sets of connective parts, one set of said connective parts normally occupying a uniform relation to said common actuating device and the other set of connective parts being successively more remote from said common actuating device, for the purpose set forth.

6. In a caculating-machine, a shiftable type-carrier frame, a group of connectors common to said frame and severally adapted to be connected therewith, keys for specially and independently moving said connectors, and an actuating device adapted to positively actuate said connectors and through the latter said frame said connectors being provided with an engaging member bearing a uniform relation to the sliding frame relative to the direction of movement of the latter, and each provided with a second engaging part which latter parts severally bear different relations to said common actuating device, whereby a uniform travel of the common actuating device will impart a varied travel to the shiftable type-carrier frame depending upon which of the connectors forms the connection therebetween.

7. In a calculating-machine, the combination with a recording mechanism and an actuating mechanism therefor, of a series of connectors adapted to selectably form positive driving connections between said actuating mechanism and recording mechanism, and means operable independently of said actuating mechanism for placing said connectors in functionally-operative position.

8. In a calculating-machine, the combination with a recording mechanism and an actuating mechanism therefor, of a series of connectors adapted to selectably form positive driving connections between said actuating mechanism and recording mechanism, and means operable independently of said actuating mechanism for placing said connectors in functionally-operative position, said connectors being mounted in bearings permitting a compound movement thereof, whereby the connectors may move with the actuating mechanism when functionally operative.

9. In a calculating-machine, the combination of a series of independent connectors, recording mechanism independent of said connectors, an independent actuating device common to all said connectors, and adapted to form an interlocking engagement with said connectors during its movement in one direction and to automatically disengage itself therefrom upon a reverse movement, and means for independently imparting an initial movement to said connectors whereby they may be selectably placed in functionally-operative position.

10. In a calculating-machine, a connector provided with two engaging projections one of which is adapted to form hooked engagement with a coöperating part, a spring tending to return said connector to its normal position, a spring-detent arranged to automatically engage and hold said connector in projected position, means operating to automatically release said spring-detents and means for operating said connector, for the purpose set forth.

11. In a calculating-machine, the combination with a vertically-sliding frame provided with a transverse engaging recess, of a series of connectors common to said sliding frame and each provided with an engaging projection adapted to enter the recess of the frame, each also provided with a second engaging projection which projections of the several connectors are successively more remote from the recess-engaging projection, means for independently operating said connectors to shift the latter into operative engagement with the sliding frame and an actuating device common to all of said connectors, and adapted to selectively actuate that one of the connectors which has been shifted into engagement with the sliding frames, for the purpose set forth.

12. In a machine of the general character described, the combination with a recording mechanism, and actuating device therefor having a definite forward-and-return movement, of a series of connectors adapted to selectably form positive driving connections between said recording mechanism and actuating device, each provided with an interlocking hook which normally stands out of the path of movement of the actuating device, means for independently projecting said hooks into the path of the actuating device, an arrested surface against which said connectors rest in their normal positions, and spring connections tending to restore said connectors to their normal positions, said actuating device in its return movement being carried beyond the position at which all of the connectors are arrested whereby they are automatically unhooked from the actuating device.

13. In a machine of the character referred to, a connector-bar mounted at one end by means of the slot-and-pin connection upon a suitable support, and slidingly supported at a point remote from said slot-and-pin connection, a spring tending to hold said connector in its normal position, a key operatively connected with said connector to shift the latter against the tension of said spring, a detent arranged to automatically engage and hold said connector in its shifted position, an actuating device arranged to move back and forth in an arc substantially concentric with said slot-and-pin connection of the connector, means for interlocking said connector with said actuating device and means for operatively engaging the connector with a part of the machine to be operated therethrough.

14. In a calculating-machine, a series of connectors shiftably mounted adjacent to each other, spring connections tending to hold said connectors at one limit of movement, a spring-detent adapted to automatically engage and hold either of said connectors when shifted from its normal position, independent keys for independently actuating said connectors, and means for automatically disengaging said spring-detent from a previously-operated connector upon the operation of a second connector of the series.

15. In a machine of the character referred to, the combination of a group of connectors mounted on one end upon slot-and-pin connections and slidingly guided at their opposite ends, spring connections tending to normally hold said connectors in retracted position, a plate-spring mounted upon a fixed support to bear yieldingly against said connectors at points remote from their slot-and-pin connections, a shoulder upon each of said connectors adapted to engage the end of said spring when in projected position, and a cam-surface arranged to flex the spring during the projecting movement of each connector whereby the operation of successive connectors operates to automatically disengage any connector which may at the time be engaged and held by said spring-detent.

16. In combination with a group of connectors having endwise and oscillatory movement and severally provided with hooks, an L-shaped bail-bar provided with a hook portion adapted to interlock with the hooks of the connectors, and means for actuating said bail-bar in an arc concentric with the pivotal axis of the connectors.

17. In a calculating-machine, the combination with a plurality of pairs of parallel guides, of a series of type-carrier frames mounted to reciprocate upon said guides each comprising a pair of cross-bars operatively mounted upon said guides at distances apart, a connecting tie-bar and a rack-bar extending between said cross-bars, a bracket mounted upon said frame, and a type-carrier bar pivotally mounted upon said bracket.

18. In a calculating-machine, the combination with a plurality of pairs of parallel guides, of a series of type-carrier frames mounted to reciprocate upon said guides each comprising a pair of cross-bars operatively mounted upon said guides at distances apart, a connecting tie-bar and a rack-bar extending between said cross-bars, a bracket mounted upon said frame, an engaging member adapted for connection with a series of actuating devices at one side of said frame, and a second rack member upon its opposite side, substantially as set forth.

19. In a calculating-machine, the combination with a plurality of pairs of parallel guides, of a series of type-carrier frames mounted to reciprocate upon said guides each comprising a pair of cross-bars operatively mounted upon said guides at distances apart, a connecting tie-bar and a rack-bar extending between said cross-bars, a bracket mounted upon said frame, an engaging member adapted for connection with a series of actuating devices at one side of said frame, and a second rack member upon its opposite side, the rack members which extend between the cross-bars of the several sliding frames of the series being arranged in offset relation and the guides upon which said sliding frames reciprocate being arranged in transverse alinement, for the purpose set forth.

20. In combination, a printing-platen, a series of type movably supported adjacent thereto, a series of impression-levers pivotally supported adjacent to said type and arranged to act thereon, and an actuating device provided with cam-surfaces arranged to act directly upon said impression-levers successively to force the latter by a gradual cam action into engagement with the type, for the purpose set forth.

21. In combination, a printing-platen, a series of type movably mounted adjacent thereto, a series of impression-levers pivotally supported adjacent to said type, an actuating device provided with cam-surfaces arranged to act successively upon said impression-levers, and means for adjusting the fulcrum-points of the impression-levers to vary the type impression.

22. In combination with a platen, and type movably mounted adjacent thereto, a series of impression-levers pivotally and shiftably mounted adjacent to said type, means for oscillating said impression-levers, a fulcrum-support arranged to hold said levers in operative position, and means for at will withdrawing said support from one or more of said impression-levers.

23. In combination with a platen, and type movably mounted adjacent thereto, a series of impression-levers pivotally mounted at points between their ends by means of slot-and-pin connections whereby they are bodily movable toward and from the type, an actuating device for oscillating said impression-levers, and a fulcrum-support for holding said levers in operative position and shiftable into and out of register with said levers, for the purpose set forth.

24. In combination with a platen, and type movably mounted adjacent thereto, a series of impression-levers pivotally mounted at points between their ends by means of slot-and-pin connections whereby they are bodily movable toward and from the type, an actuating device for oscillating said impression-levers comprising a cam-bar provided with a series of cam-surfaces adapted to be brought into operative engagement with the impression-levers successively, a fulcrum-support for holding said levers in operative position and shiftable into and out of register with said levers, for the purpose set forth.

25. In combination with a platen, and a series of type movably supported adjacent thereto, a series of impression-levers movably supported, an actuating device for forcing said levers into engagement with the type, a fulcrum member movable into and out of register with said levers, and stop devices automatically set by the operation of moving the type into printing position for determining the extent of movement of the fulcrum member.

26. In combination with a platen, and a series of type-carriers movable adjacent thereto, stop members moving with said carriers, a series of impression-levers adapted to act upon said carriers, a fulcrum member movable into and out of register with said impression-levers, means for actuating the impression-levers to force the latter into engagement with the type-carriers, a part moving with said lever-actuating means, yieldably connected with said fulcrum member, and a part upon the latter adapted to coöperate with the stop portions of the carriers to limit the withdrawal movement of the fulcrum member.

27. In combination with a platen, and series of type movably mounted adjacent thereto, a fulcrum member of plate-like form provided with separate bearing-points, an adjusting-screw inserted therethrough at a point between the bearing-points and into a fixed support, a series of impression-levers mounted to oscillate in bearing with said fulcrum member, means for actuating said impression-levers and means for adjusting said fulcrum member to vary the impression.

28. In a key mechanism of the general character described, the combination of a base-board, and a series of key-staves rising through and projecting above said base-board, each provided at its upper end with a tip provided with an annular finger-bearing surface constructed to receive the entire operating pressure of the finger whereby the ball of the finger is relieved.

29. In a key mechanism of the general character described, the combination of a base-board, a series of key-staves supported and guided therein, and arranged to rise above the base-board, each staff being provided with an integral annular tip, substantially as described.

30. In a key mechanism for a calculating-machine, the combination of a series of keys provided with finger-tips, a base-board underlying the tip portions of said keys, and an outlining-frame comprising strips subdividing said keys into groups representing the different orders of numerals, said strips being provided adjacent to the respective keys with designating characters.

31. In a calculating-machine, a series of connectors, a series of key-levers for actuating said connectors and means for supporting said key-levers and connectors, comprising a vertically-disposed plate-like frame member provided at its upper portion with key-lever bearings and below the latter with connector-supports, said key-levers and connectors being disposed in pairs alternately on opposite sides of the support.

32. In a calculating-machine, a series of shiftable connectors representing one order of numerals, and a corresponding series of key-levers, and means for supporting said connectors and key-levers comprising a plate-like support arranged with its plane substantially vertical, a series of pivot-studs connected with its upper portion and forming supports for the key-levers, and guide-studs upon its lower portion for supporting the connectors, said key-levers and connectors being arranged in coöperating pairs and disposed alternately on opposite sides of the support in the order of the numerals.

33. In a calculating-machine, a plurality of groups of connectors, a plurality of groups of key-levers for actuating said connectors, a support for each of said groups of connectors and key-levers consisting of a plate-like vertically-disposed frame member and means for uniting the several groups and their supports comprising transversely-extending tie members and interposed spacing members, for the purpose set forth.

DE KERNIEA J. T. HIETT.

Witnesses:
FREDERICK C. GOODWIN,
SAMUEL N. POND.